US012567300B2

(12) United States Patent
Edmonds et al.

(10) Patent No.: US 12,567,300 B2
(45) Date of Patent: Mar. 3, 2026

(54) VENDING MACHINE PRODUCT DELIVERY SYSTEM WITH VARIABLE RETRIEVAL SPEED

(71) Applicant: Crane Payment Innovations, Inc., Malvern, PA (US)

(72) Inventors: Carter Edmonds, Columbia, SC (US); Jeremy Vacek, Dusseldorf (DE); Talbert Black, Jr., Lexington, SC (US)

(73) Assignee: Crane Payment Innovations, Inc., Malvern, PA (US)

( * ) Notice: Subject to any disclaimer, the term of this patent is extended or adjusted under 35 U.S.C. 154(b) by 631 days.

(21) Appl. No.: 17/997,520

(22) PCT Filed: Apr. 29, 2021

(86) PCT No.: PCT/US2021/029971
§ 371 (c)(1),
(2) Date: Oct. 28, 2022

(87) PCT Pub. No.: WO2021/222627
PCT Pub. Date: Nov. 4, 2021

(65) Prior Publication Data

US 2023/0174304 A1 Jun. 8, 2023

Related U.S. Application Data

(60) Provisional application No. 63/017,834, filed on Apr. 30, 2020.

(51) Int. Cl.
*G07F 11/42* (2006.01)
*G07F 11/16* (2006.01)

(52) U.S. Cl.
CPC ............ *G07F 11/42* (2013.01); *G07F 11/165* (2013.01)

(58) Field of Classification Search
CPC ........ G07F 11/42; G07F 11/16; G07F 11/165; G07F 9/02
See application file for complete search history.

(56) References Cited

U.S. PATENT DOCUMENTS

| | | | | |
|---|---|---|---|---|
| 6,513,677 | B1 * | 2/2003 | Sorensen | G07F 11/42 221/242 |
| 7,604,145 | B2 * | 10/2009 | Percy | G07F 11/42 221/95 |

(Continued)

FOREIGN PATENT DOCUMENTS

| | | | |
|---|---|---|---|
| CN | 110073422 | A | 7/2019 |
| CN | 110419064 | A | 11/2019 |
| WO | 2018111493 | A1 | 6/2018 |
| WO | 2018132763 | A1 | 7/2018 |

OTHER PUBLICATIONS

Supplementary European Search Report dated Feb. 15, 2024, issued in connection with European Application No. 21797592.9, 4 pages.

(Continued)

*Primary Examiner* — Timothy R Waggoner

(57) ABSTRACT

A vending machine comprises a chassis, a shelf system including a plurality of product rows, a plurality of product gates each coupled to an associated one of the plurality of product rows, a movable stage, a retrieval platform, and a vending machine controller coupled to at least one memory. The vending machine controller is configured to determine a product code and a storage location of a selected product for vending, retrieve, from the at least one memory, timing parameters associated with at least one of the product code or the storage location of the selected product, and control one or more timings of one of the plurality of product gates associated with the determined storage location of the selected product, based on the retrieved timing parameters, to release the selected product from the shelf system to the retrieval platform.

18 Claims, 24 Drawing Sheets

(56) References Cited

U.S. PATENT DOCUMENTS

| | | | | |
|---|---|---|---|---|
| 2001/0000609 | A1 | 5/2001 | Rudick et al. | |
| 2003/0075552 | A1* | 4/2003 | Ohkubo | G07F 11/58<br>221/131 |
| 2005/0067426 | A1* | 3/2005 | Holdway | G07F 11/16<br>221/131 |
| 2006/0208851 | A1 | 9/2006 | Tsunoda | |
| 2008/0121648 | A1 | 5/2008 | Hair et al. | |
| 2008/0296314 | A1* | 12/2008 | Yanagisawa | G07F 11/42<br>221/226 |
| 2010/0070075 | A1 | 3/2010 | Chirnomas | |
| 2011/0226795 | A1* | 9/2011 | Sichich | G07F 11/165<br>221/133 |
| 2012/0004769 | A1 | 1/2012 | Hallenbeck et al. | |
| 2018/0174392 | A1* | 6/2018 | Jafa | G07F 11/165 |
| 2020/0302730 | A1* | 9/2020 | Fukuda | G07F 11/10 |

OTHER PUBLICATIONS

Communication pursuant to Article 94(3) EPC dated Feb. 27, 2024, issued in connection with European Application No. 21797592.9, 7 pages.
International Search Report and Written Opinion issued Jul. 28, 2021 regarding Application No. PCT/US2021/029971, 8 pages.
Notification of the First Office Action dated Apr. 21, 2025, in connection with Chinese Application No. 202180029669.1, 17 pages.
Notification of Second Office Action dated Sep. 10, 2025, in connection with Chinese Application No. 202180029669.1, 12 pages.
Rejection Decision dated Nov. 27, 2025, in connection with Chinese Application No. 202180029669.1, 13 pages.

* cited by examiner

| Location | Product Code | Price |
|---|---|---|
| 101 | 0-12345-67890-5 | 0.99 |
| 102 | 4-85732-87158-6 | 1.50 |
| 103 | 6-12356-87125-7 | 2.25 |
| . . . | . . . | . . . |

| Location | Product Code | Gate Open | Duration | Gate Close |
|---|---|---|---|---|
| 101 | 0-12345-67890-5 | 500 ms | 1000 ms | 500 ms |
| 102 | 0-12345-67890-5 | 1000 ms | 1000 ms | 1000 ms |
| 103 | 4-85732-87158-6 | 500 ms | 1250 ms | 800 ms |
| . . . | . . . | . . . | . . . | . . . |

VENDING MACHINE PRODUCT DELIVERY SYSTEM WITH VARIABLE RETRIEVAL SPEED

CROSS REFERENCE TO RELATED APPLICATIONS

This application is a 371 National Stage of International Application No. PCT/US2021/029971, filed Apr. 29, 2021, which claims priority to U.S. Provisional Patent Application No. 63/017,834, filed Apr. 30, 2020, the disclosures of which are herein incorporated by reference in their entirety.

TECHNICAL FIELD

The present disclosure is generally directed to vending machines. More specifically, the present disclosure is directed to a vending machine product delivery system with variable retrieval speed.

BACKGROUND

Vending machines include many complex mechanisms. Today, many vending machines include electronic systems to select, pay, and dispense a product. Also, many vending machines include complex electro-mechanical systems for delivery of the product from a storage location to a customer accessible product retrieval location. These delivery systems in some of the vending machines may not provide a smooth transition of the product from a column to an access port. In particular, the transition of the product from a column to a cup may be rough. Additionally, due to product proliferation in terms of size and shape, the ability to reliably retrieve and deliver a product in a vending machine has become difficult. As such, current vending machines are limited with respect to the types of products that can be vended.

SUMMARY

The present disclosure provides vending machine product delivery system with variable retrieval speed.

In one aspect thereof, a vending machine comprises a chassis, at least one shelf including a plurality of product rows, a plurality of product gates each coupled to an associated one of the plurality of product rows, a movable stage, a retrieval platform coupled to the movable stage, wherein the retrieval platform is operable to move to accept a product from one of the plurality of product rows, and a vending machine controller coupled to at least one memory. The vending machine controller is configured to determine a product code and a storage location of a selected product for vending, retrieve, from the at least one memory, timing parameters associated with at least one of the product code or the storage location of the selected product, and control one or more timings of one of the plurality of product gates associated with the determined storage location of the selected product, based on the retrieved timing parameters, to release the selected product from the at least one shelf to the retrieval platform.

In another aspect thereof, a vending machine comprises a chassis, at least one shelf system including a plurality of product rows, a plurality of product gates each coupled to an associated one of the plurality of product rows, a movable stage, a retrieval platform coupled to the movable stage, wherein the retrieval platform is operable to move to accept a product from one of the plurality of product rows, and a vending machine controller coupled to at least one memory.

The vending machine controller is configured to determine a product code and a storage location of a selected product for vending, retrieve, from the at least one memory, timing parameters associated with at least one of the product code or the storage location of the selected product, and control one or more timings of one of the plurality of product gates associated with the determined storage location of the selected product, based on the retrieved timing parameters, to release the selected product from the at least one shelf system to the retrieval platform.

In some embodiments, the timing parameters include parameters for a gate opening speed, a gate open duration, and a gate closing speed.

In some embodiments, to control the one or more timings of the one of the plurality of product gates, the vending machine controller is further configured to modulate one or more pulse width modulation (PWM) signals, wherein each of the one or more PWM signals are associated with one of the gate opening speed, the gate open duration, and the gate closing speed.

In some embodiments, the timing parameters associated with the storage location of the selected product are based on dimensions of the at least one shelf system and an angle of one of the plurality of product rows associated with the storage location of the selected product.

In some embodiments, the timing parameters associated with the product code are based on at least one of shape or weight of a product type associated with the product code.

In some embodiments, the vending machine further comprises a pusher plate mounted on a sidewall of at least one product row of the plurality of product rows, wherein the pusher plate is operable to push products in the at least one product row towards an end of the at least one product row.

In some embodiments, the end of the at least one product row is associated with a retrieval location of the retrieval platform.

In some embodiments, the retrieval platform includes a surface disposed at a base of the retrieval platform, and wherein the retrieval platform is operable to rotate in a direction of the at least one shelf system when the movable stage positions the retrieval platform in relation to one of the plurality of product rows.

In some embodiments, each of the plurality of product gates includes a release mechanism operable to release a product from the associated one of the plurality of product rows when, due to the rotation of the retrieval platform, the surface of the retrieval platform depresses the release mechanism.

In some embodiments, an angle of the retrieval platform, when the retrieval platform rotates in the direction of the at least one shelf system, matches an angle of at least one of the plurality of product rows.

In another aspect thereof, a method of dispensing a product from a vending machine comprises receiving data on a selected product for vending, determining a product code and a storage location of a selected product for vending, retrieving timing parameters associated with at least one of the product code or the storage location of the selected product, moving a retrieval platform coupled to a moveable stage to a position to accept the selected product from one of a plurality of product rows of at least one shelf system of the vending machine, and controlling one or more timings of one of a plurality of product gates associated with the determined storage location of the selected product, based on the retrieved timing parameters, to release the selected product from the at least one shelf system to the retrieval platform, wherein each of the plurality of product gates are coupled to an associated one of the plurality of product rows.

In some embodiments, the timing parameters include parameters for a gate opening speed, a gate open duration, and a gate closing speed.

In some embodiments, controlling the one or more timings of the one of the plurality of product gates includes modulating one or more pulse width modulation (PWM) signals, wherein each of the one or more PWM signals are associated with one of the gate opening speed, the gate open duration, and the gate closing speed.

In some embodiments, the timing parameters associated with the storage location of the selected product are based on dimensions of the at least one shelf system and an angle of one of the plurality of product rows associated with the storage location of the selected product.

In some embodiments, the timing parameters associated with the product code are based on at least one of shape or weight of a product type associated with the product code.

In some embodiments, the method further comprises pushing, with a pusher plate mounted on a sidewall of at least one product row of the plurality of product rows, products in the at least one product row towards an end of the at least one product row.

In some embodiments, the end of the at least one product row is associated with a retrieval location of the retrieval platform.

In some embodiments, the retrieval platform includes a surface disposed at a base of the retrieval platform, and further comprising rotating the retrieval platform in a direction of the at least one shelf system when the movable stage positions the retrieval platform in the position to accept the selected product.

In some embodiments, the method further comprises depressing, by the surface of the retrieval platform when the retrieval platform rotates, a release mechanism of one of the plurality of product gates to release a product from the associated one of the plurality of product rows.

In some embodiments, an angle of the retrieval platform, when the retrieval platform rotates in the direction of the at least one shelf system, matches an angle of at least one of the plurality of product rows.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document: the terms “include” and “comprise,” as well as derivatives thereof, mean inclusion without limitation; the term “or,” is inclusive, meaning and/or; the phrases “associated with” and “associated therewith,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term “controller” means any device, system or part thereof that controls at least one operation, such a device may be implemented in hardware, firmware or software, or some combination of at least two of the same. It should be noted that the functionality associated with any particular controller may be centralized or distributed, whether locally or remotely. The phrase “at least one of,” when used with a list of items, means that different combinations of one or more of the listed items may be used, and only one item in the list may be needed. Definitions for certain words and phrases are provided throughout this patent document, those of ordinary skill in the art should understand that in many, if not most instances, such definitions apply to prior, as well as future uses of such defined words and phrases.

The terms “transmit,” “receive,” and “communicate,” as well as derivatives thereof, encompasses both direct and indirect communication. The terms “include” and “comprise,” as well as derivatives thereof, mean inclusion without limitation. The term “or” is inclusive, meaning and/or. The phrase “associated with,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase “at least one of,” when used with a list of items, means that different combinations of one or more of the listed items may be used, and only one item in the list may be needed. For example, “at least one of: A, B, and C” includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure, reference is now made to the following description, taken in conjunction with the accompanying drawings, in which.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system.

Figure 1:
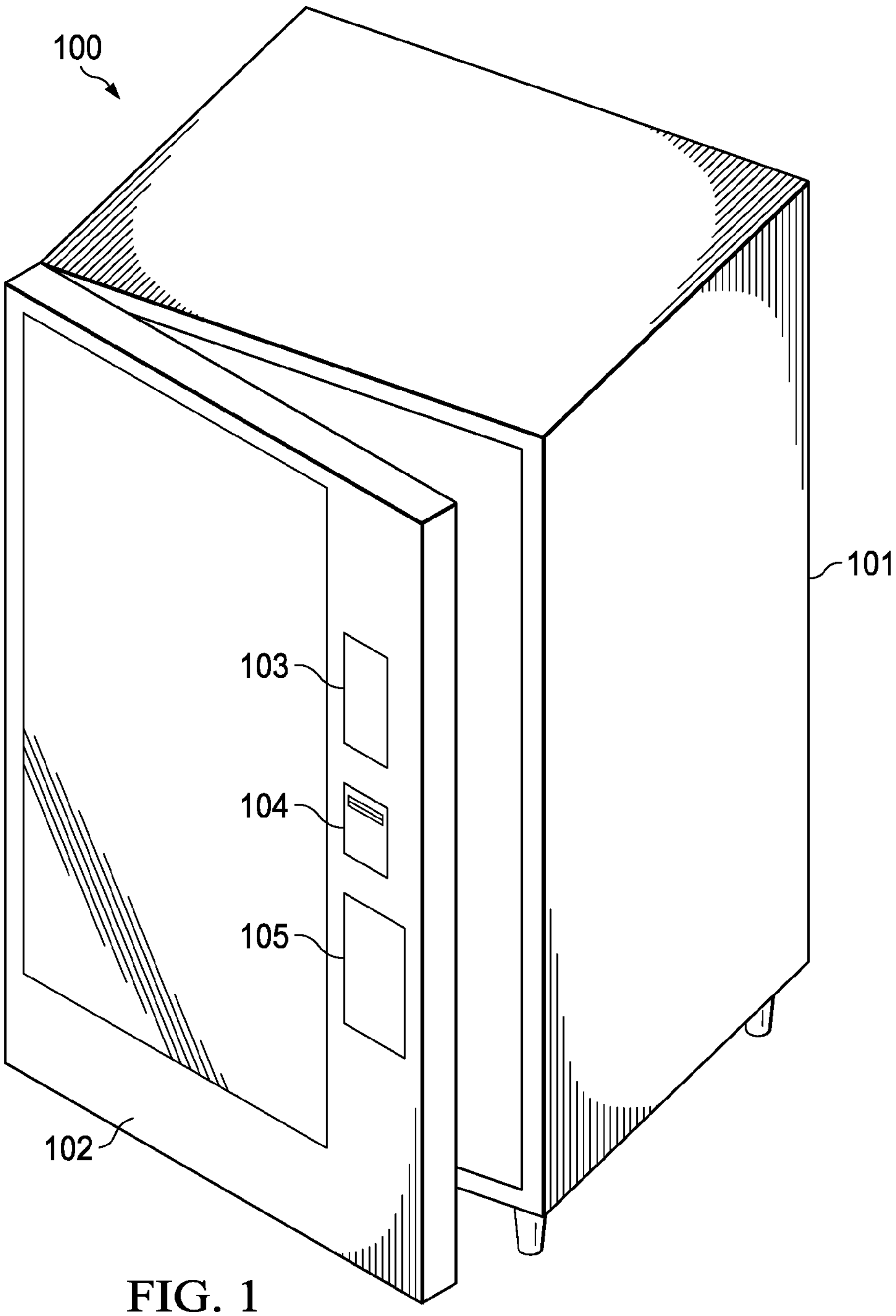
FIG. 1 illustrates a simplified perspective view of a vending machine according to embodiments of the present disclosure.

FIG. 1 illustrates a simplified perspective view of a vending machine 100 according to embodiments of the present disclosure. Vending machines come in a wide variety of configurations, and FIG. 1 does not limit the scope of the present disclosure to any particular implementation of a vending machine.

Vending machine 100 includes a chassis or cabinet 101 and a service door 102 that, together, define an enclosure. In the embodiment illustrated in FIG. 1, the service door 102 is pivotally mounted to the front of the cabinet 101 and extends all the way across the front face of the vending machine 100. In alternate embodiments, the service door may extend only part way across the front of the vending machine, or may be formed in two portions (of equal or unequal sizes) that swing open in opposite directions. In alternate embodiments, the service door may slide open and allow customer to access products. In alternate embodiments, the vending machine may not have a service door.

In the embodiment illustrated in FIG. 1, the service door 102 includes a customer user interface 103, illustrated as a touch screen liquid crystal display (LCD) display. A payment system 104 is mounted within the service door 102 and includes one or more of a bill validator, a coin acceptor and/or a credit or debit card reader. The payment system 104 receives currency, coins or other forms of payment from the customer and returns change as necessary. FIG. 1 also depicts an access port 105 to a delivery receptacle mounted within the service door 102 or in the cabinet 101. The access port 105 may have a delivery door or other mechanical system (e.g., rotatable delivery receptacle open on one side) for controlling or restricting access by the customer into the delivery receptacle, the interior of the vending machine, or both. Those skilled in the art will recognize that in some vending machines, particularly helical coil snack vending machines, the access port 105 may be located near the bottom of the vending machine and extend across most of the width of the machine, below a large glass window allowing the contents within the cabinet to be viewed or a large liquid crystal display selectively presenting images of products available for vending or advertisements. Other vending machines, in particular beverage vending machines, have X-Y product retrieval and delivery mechanisms and a glass front or large liquid crystal display, but may include an access port 105 to the side as shown in FIG. 1, at a height convenient to the customer for product retrieval.

Figure 2:
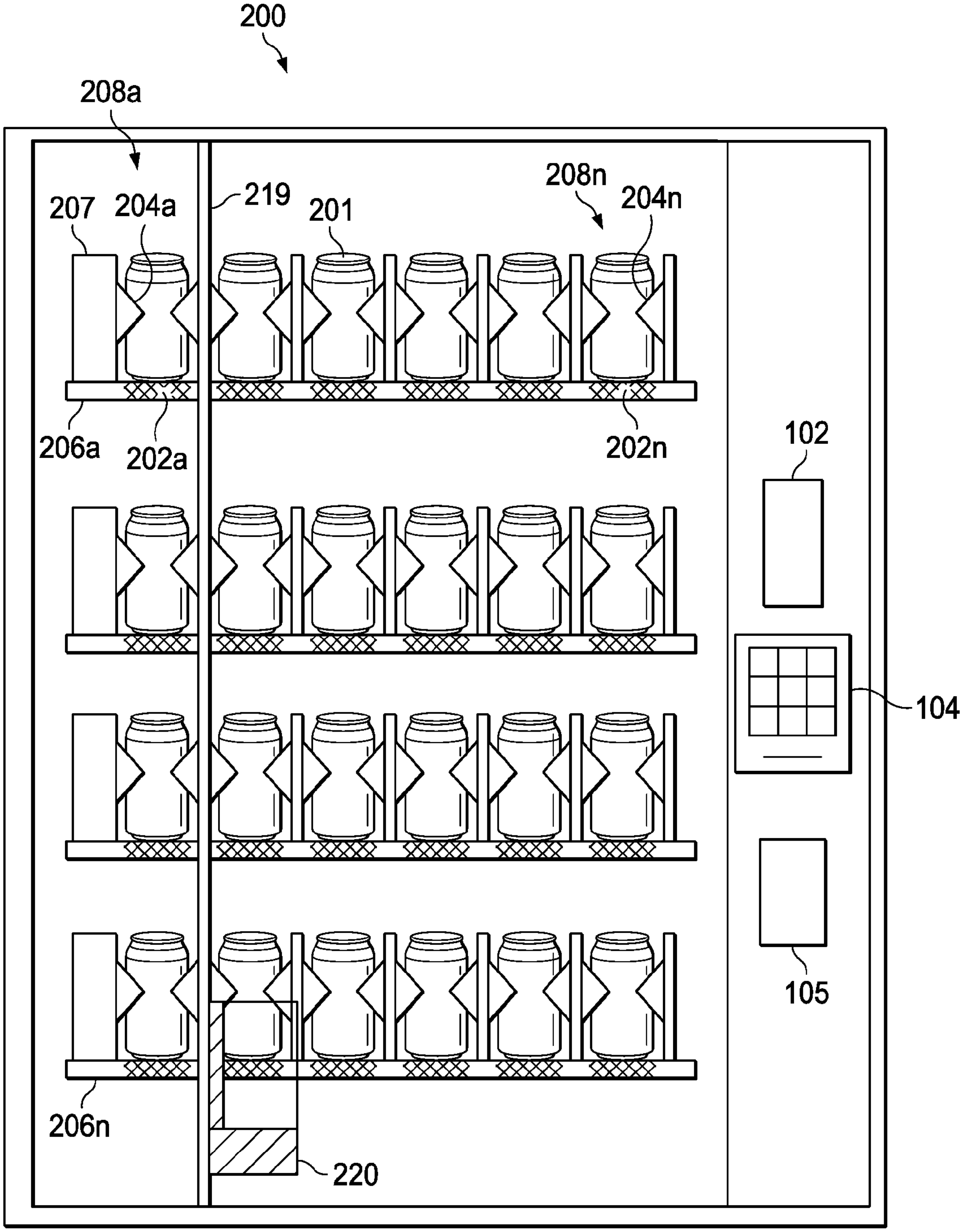
FIG. 2 illustrates a simplified perspective view illustrating a vending machine implementing a plurality of release mechanisms each for a plurality of gates according to embodiments of the present disclosure.

FIG. 2 illustrates a simplified perspective view illustrating a vending machine 200 implementing a plurality of release mechanisms 202*a* . . . 202*n* each for a plurality of gates 204*a* . . . 204*n* according to embodiments of the present disclosure. Vending machines come in a wide variety of configurations, and FIG. 2 does not limit the scope of the present disclosure to any particular implementation of a vending machine. The components of the vending machine 200 could be used with the vending machine 100 as shown in FIG. 1

The vending machine cabinet 101 houses a plurality of product trays 206*a* . . . 206*n*, each including a plurality of product columns 208*a*, 208*b* . . . 208*n*. For every product column 208*a*, there is at least one gate 204*a*. The plurality of gates 204*a* . . . 204*n* may be, but not limited to, double gates (as shown in FIG. 2 with one gate on each side of the product 201), cylindrical barriers, bars, rotational containers, and other types of barriers. The gates may be connected to a sidewall, such as sidewall 207.

In certain embodiments, for each gate 204*a*, there may be a release mechanism 202*a*. The release mechanism 202*a* can be manual or automatic. For example, release mechanism 202*a* can be motor with a gearbox, a knob, a lever, a solenoid, or some other suitable device. During a purchase of a product 201, the release mechanism 202*a* may interact with gate 204*a* that is restraining the product 201 located in column 208*a*. The release mechanism may interact with one or more gates that restrain products in a column. The interaction may allow the product 201 to move past gate 204*a*. The release mechanism 202*a* can be activated by a platform 220.

In certain embodiments, for each tray 206*a*, there is a release mechanism 202*a*. At each column, release mechanism 202*a* can release a product by interacting with a gate. As shown in this example embodiment, platform 220 is coupled to a movable stage 219 and is configured to move to a product via the movable stage 219 for vending of the product. In response to a user selection and a vend command, the movable stage 219 moves horizontally to a location associated with a product column 208*a*, 208*b* . . . 208*n*, and platform 220 moves vertically along the movable stage 219 to a product to collect the product by activating the release mechanism 202*a* and capturing the product once released from the column. The platform 220 then moves to and dispenses the product into access port 105 for customer retrieval.

FIGS. 3A-3F illustrate various views of a tilting platforms according to embodiments of the present disclosure. Tilting platforms can come in a wide variety of configurations, and FIGS. 3A-3F do not limit the scope of the present disclosure to any particular implementation of a tilting platform. The tilting platforms illustrated could be used with the vending machine 100 as shown in FIG. 1, or the vending machine 200 as shown in FIG. 2.

Figure 3A:
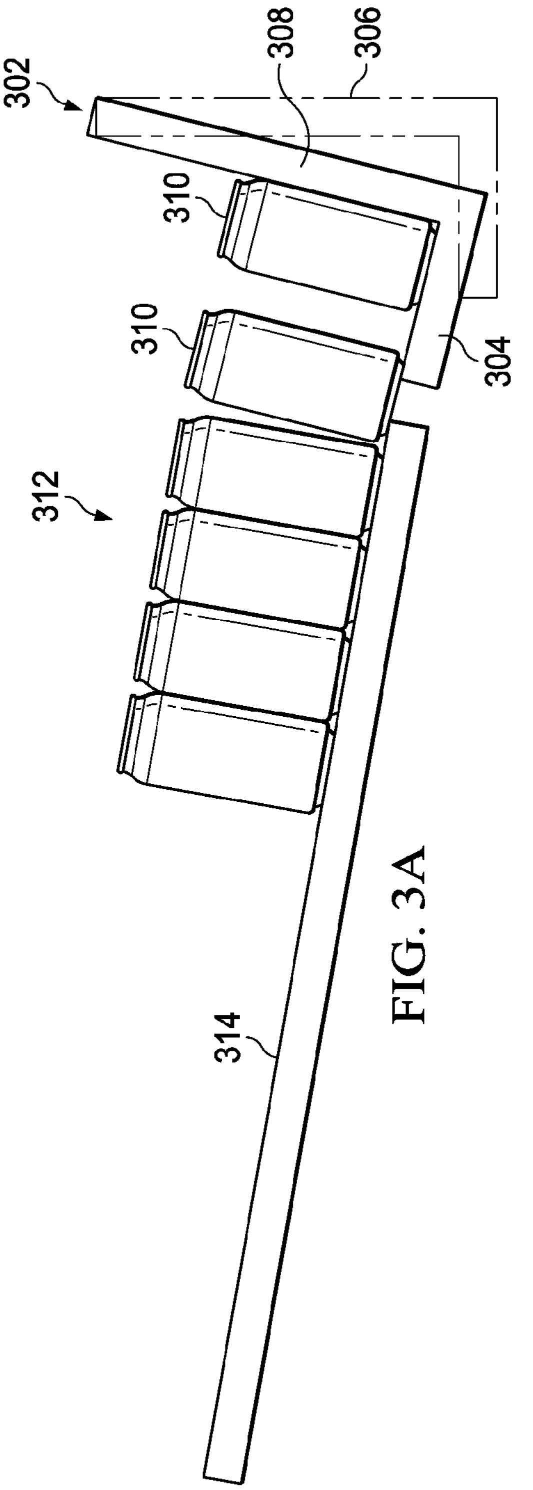
FIGS. 3A and 3B illustrate views of a tilting platform according to embodiments of the present disclosure.
Figure 3B:
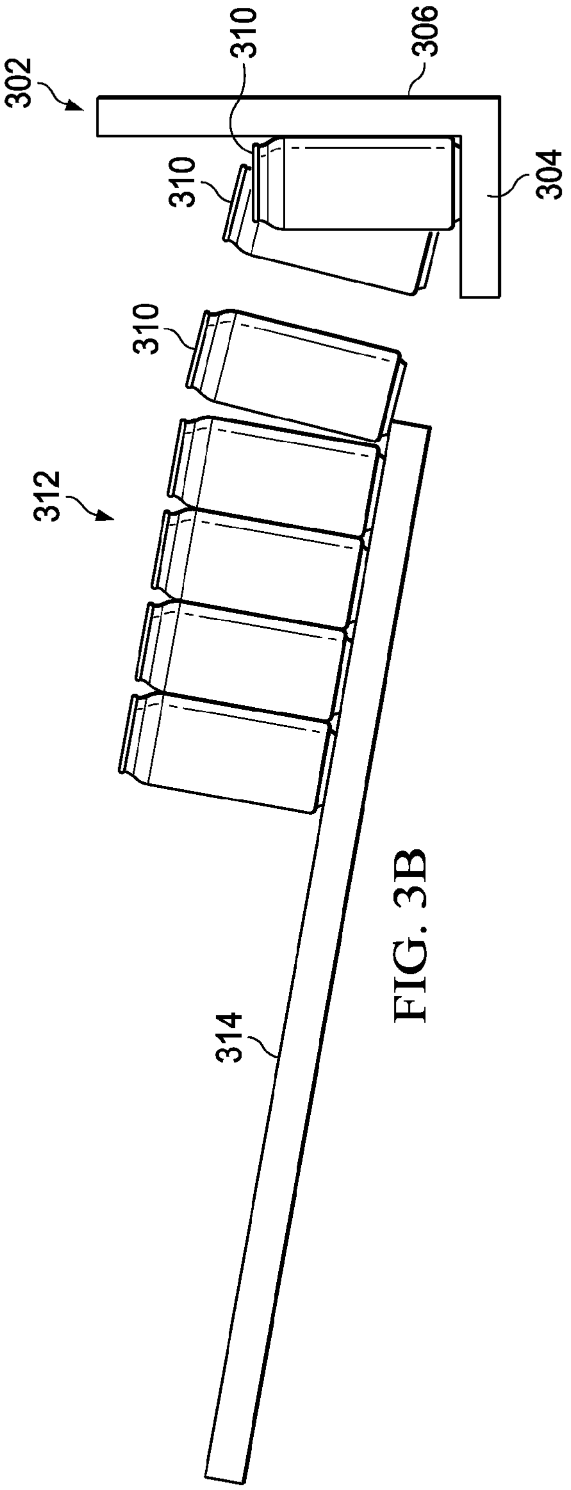
Figure 3C:
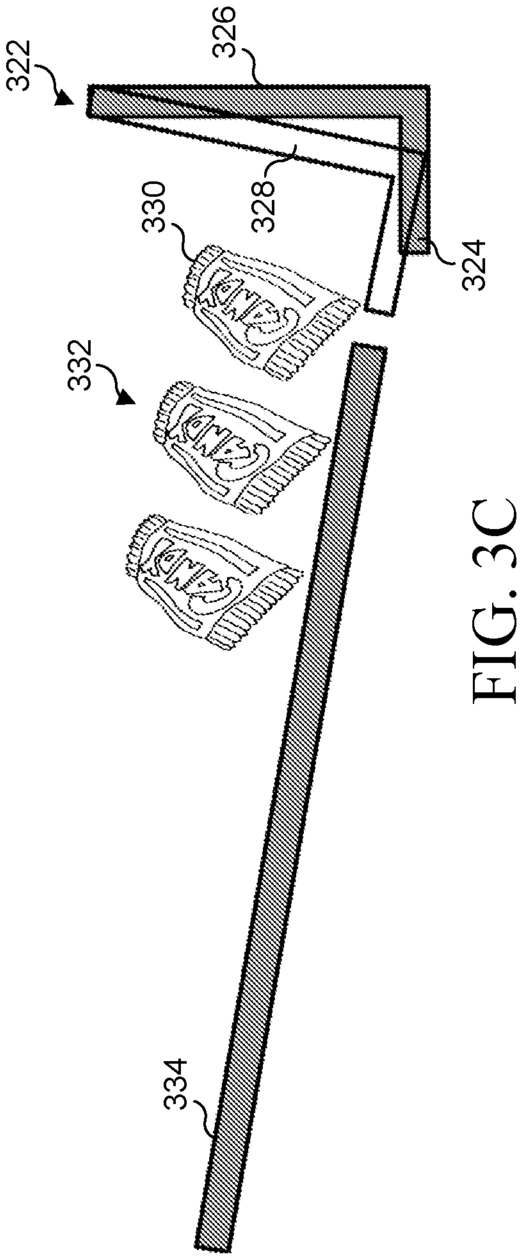
FIGS. 3C and 3D illustrate views of another tilting platform according to embodiments of the present disclosure.
Figure 3D:
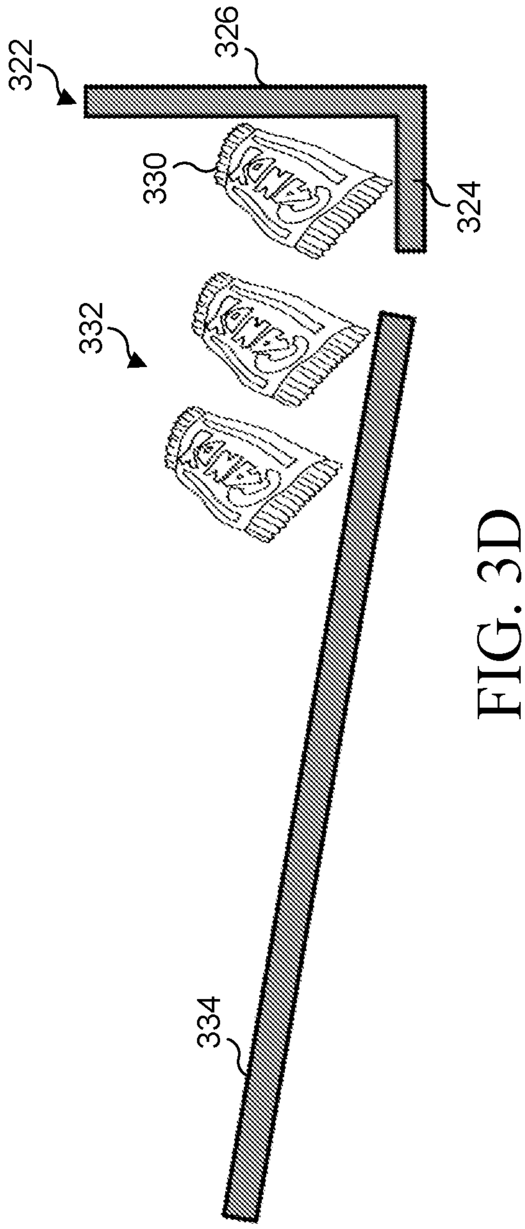
Figure 3E:
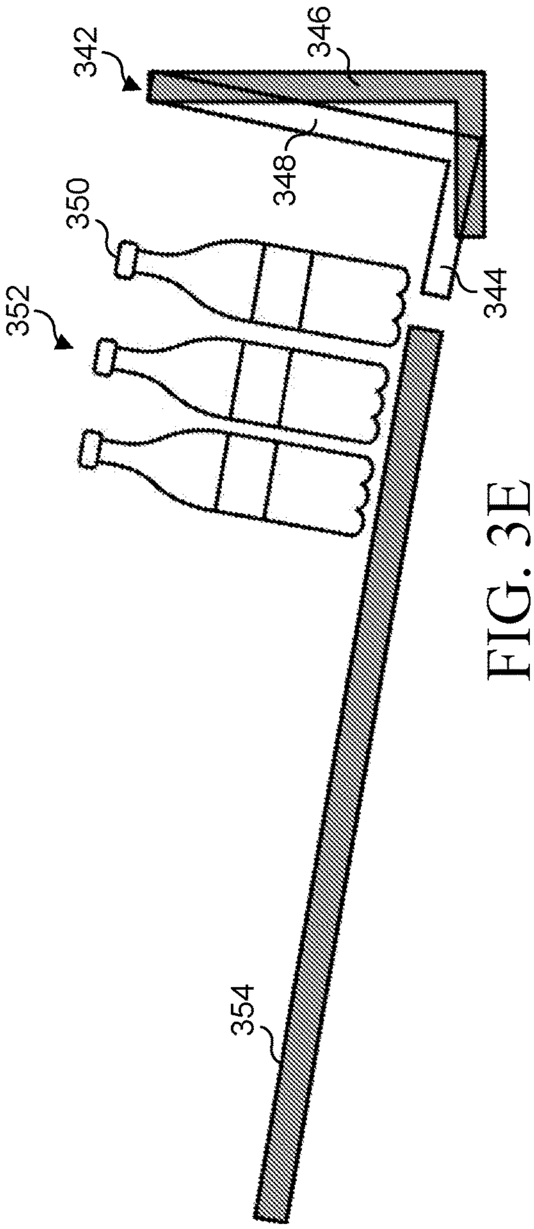
FIGS. 3E and 3F illustrate views of another tilting platform according to embodiments of the present disclosure.
Figure 3F:
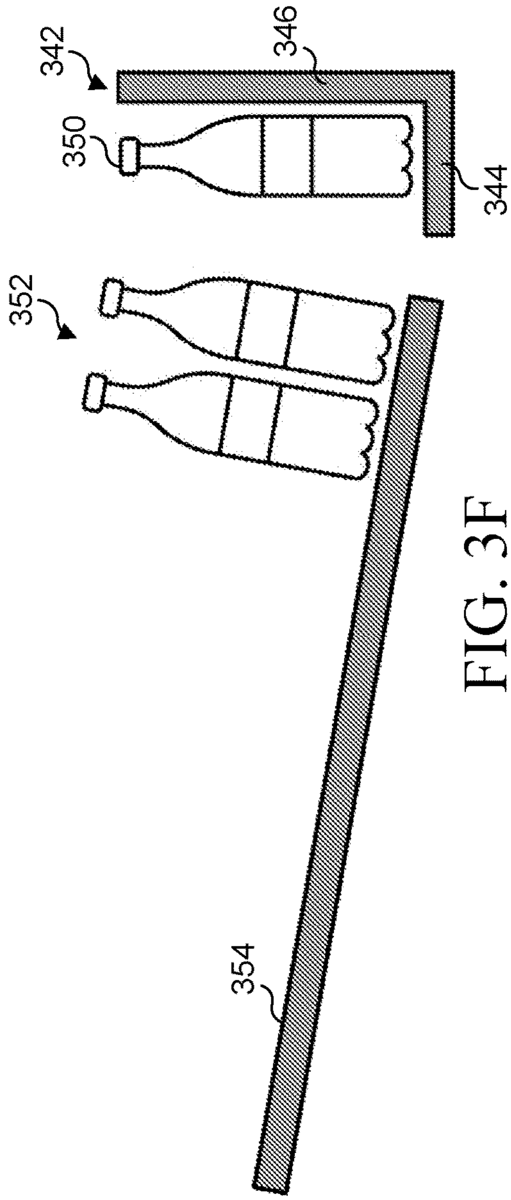

FIG. 3A illustrates a tilting platform 302 in a product retrieval position according to embodiments of the present disclosure. FIG. 3B illustrates the tilting platform 302 in an initial position according to embodiments of the present disclosure. FIG. 3C illustrates another tilting platform 322 retrieving a snack and in a product retrieval position according to embodiments of the present disclosure. FIG. 3D illustrates the tilting platform 322 of FIG. 3C in an initial position according to embodiments of the present disclosure. FIG. 3E illustrates another tilting platform 342 retrieving a bottle and in a product retrieval position according to embodiments of the present disclosure. FIG. 3F illustrates the tilting platform 342 of FIG. 3E in an initial position according to embodiments of the present disclosure.

As illustrated in FIGS. 3A and 3B, the tilting platform 302 has a shelf or "L" bracket that can be referred to as a base 304 of the tilting platform 302. The tilting platform 302 can tilt out from an initial position 306 to a tilted position 308 to accept a product 310 from a plurality of products 312 included on a product tray 314. The initial position 306 can be, for example, a vertical position (as shown in FIG. 2). The tilting platform 302 can be more stable and follow a path of motion of the falling product 310. To move the base 304 of the tilting platform 302 into the tilted position 308, the base 304 can move out towards the product tray 314 into the tilted position 308. The tilted position 308 can also be referred to as a receiving position.

In some vending machine systems, when receiving a product, such as a canned drink, as shown for example in FIGS. 3A and 3B, from a column or a product tray into a non-tilting platform or dispenser having a horizontal base, the product may tilt or bridge. Bridging occurs when the top of a product tilts during the vending process and is unable to move from the tray into the dispenser. The top of the product is in the dispenser and the bottom of the product remains in the tray, "bridging" the gap between the two. Tilting and bridging lead to failed product exchanges from the tray to the dispenser. Tilting and bridging in a non-tilted platform can happen due to the product transitioning from an angled product tray into a horizontal platform base. A tilted platform, such as tilting platform 302, allows the product to follow the path of motion of a falling product (e.g., a can), eliminating the tilting and bridging.

The angle of the base 304 in the tilted position 308 can be similar to that of the angle of the column, or the portion of the column located nearest to the base. This angle of the tilting platform 302 when in the tilted position 308 can cause the base 304 of the tilting platform to be in line with the product tray 314 such that the product 310 can slide straight into the tilting platform 302 without any tilting or bridging of the product 310. When the tilting platform 302 receives the product 310, a base of the product 310 sits atop base 304 of the tilting platform 302, and sides of the product 310 can rest against one or side walls of the tilting platform 302. The tilting platform 302 then returns to the initial position 306 for delivery of the product 310. In some embodiments, the tilting platform 302 travels to or near an access port, such as access port 105, to deposit the product 310 into the access port to allow a user to retrieve the product 310 from the access port 105.

As illustrated in FIGS. 3C and 3D, the tilting platform 322, like the tilting platform 302, includes a shelf or "L" bracket that can be referred to as a base 324 of the tilting platform 322. The tilting platform 322 can tilt out from an initial position 326 to a tilted position 328 to accept a product 330 from a plurality of products 332 included on a product tray 334. The initial position 326 can be, for example, a vertical position (as shown in FIG. 2). The tilting platform 322 can be more stable and follow a path of motion of the falling product 330. To move the base 324 of the tilting platform 322 into the tilted position 328, the base 324 can move out towards the product tray 334 into the tilted position 328. The tilted position 328 can also be referred to as a receiving position.

In some vending machine systems, when receiving a product, such as a less rigid product such as a food item packaged in a bag or plastic wrapping, such as shown for example in FIGS. 3C and 3D, from a column or a product tray into a non-tilting platform or dispenser having a horizontal base, the product may tilt, bridge, or otherwise fall over. Tilting and bridging lead to failed product exchanges from the tray to the dispenser. Tilting and bridging in a non-tilted platform can happen due to the product transitioning from an angled product tray into a horizontal platform base. Although bagged or other packaged food items can have different weights, dimensions, and characteristics, the various embodiments of the present disclosure provide for gates that, in a closed position, hold products and then suddenly release and drop the products into a dispensing mechanism such as the tilted platform 322, allowing products to slide straight into the dispensing mechanism. A tilted platform, such as tilting platform 322, allows the product to follow the path of motion of a falling product (e.g., a bag), eliminating the tilting and bridging.

The angle of the base 324 in the tilted position 328 can be similar to that of the angle of the column, or the portion of the column located nearest to the base. This angle of the tilting platform 322 when in the tilted position 328 can cause the base 324 of the tilting platform to be in line with the product tray 334 such that the product 330 can slide straight into the tilting platform 322 without any tilting or bridging of the product 330. When the tilting platform 322 receives the product 330, a base of the product 330 sits atop base 324 of the tilting platform 322, and sides of the product 330 can rest against one or side walls of the tilting platform 322. The tilting platform 322 then returns to the initial position 326 for delivery of the product 330. In some embodiments, the tilting platform 322 travels to or near an access port, such as access port 105, to deposit the product 330 into the access port to allow a user to retrieve the product 330 from the access port 105.

As illustrated in FIGS. 3E and 3F, the tilting platform 342, like the tilting platforms 302 and 322, includes a shelf or "L" bracket that can be referred to as a base 344 of the tilting platform 342. The tilting platform 342 can tilt out from an initial position 346 to a tilted position 348 to accept a product 350 from a plurality of products 352 included on a product tray 354. The initial position 346 can be, for example, a vertical position (as shown in FIG. 2). The tilting platform 342 can be more stable and follow a path of motion of the falling product 350. To move the base 344 of the tilting platform 342 into the tilted position 348, the base 344 can move out towards the product tray 354 into the tilted position 348. The tilted position 348 can also be referred to as a receiving position.

In some vending machine systems, when receiving a product, such as product with non-uniform weight distribution, such as a bottle having a heavier bottom portion than the top elongated bottle neck portion, such as shown for example in FIGS. 3E and 3F, from a column or a product tray into a non-tilting platform or dispenser having a horizontal base, the product may tilt, bridge, or otherwise fall over. Tilting and bridging lead to failed product exchanges from the tray to the dispenser. Tilting and bridging in a non-tilted platform can happen due to the product transitioning from an angled product tray into a horizontal platform base. Although bottled items can have different weights, dimensions, and characteristics, the various embodiments of the present disclosure provide for gates that, in a closed position, hold products and then suddenly release and drop the products into a dispensing mechanism such as the tilted platform 342, allowing products to slide straight into the dispensing mechanism. A tilted platform, such as tilting platform 342, allows the product to follow the path of motion of a falling product (e.g., a bottle), eliminating the tilting and bridging.

The angle of the base 344 in the tilted position 348 can be similar to that of the angle of the column, or the portion of the column located nearest to the base. This angle of the tilting platform 342 when in the tilted position 348 can cause the base 344 of the tilting platform to be in line with the product tray 354 such that the product 350 can slide straight into the tilting platform 342 without any tilting or bridging of the product 350. When the tilting platform 342 receives the product 350, a base of the product 350 sits atop base 344 of the tilting platform 342, and sides of the product 350 can rest against one or side walls of the tilting platform 342. The tilting platform 342 then returns to the initial position 346 for delivery of the product 350. In some embodiments, the tilting platform 342 travels to or near an access port, such as access port 105, to deposit the product 350 into the access port to allow a user to retrieve the product 350 from the access port 105.

In some vending machine systems, when receiving a product, such as product with non-uniform weight distribution, such as a box having a heavier side portion than rest of the box, such as a salad dressing on a side of a box or a meal box with salad and say a sandwich on separate side of a box, from a column or a product tray into a non-tilting platform or dispenser having a horizontal base, the product may tilt, bridge, or otherwise fall over. Tilting and bridging lead to failed product exchanges from the tray to the dispenser. Tilting and bridging in a non-tilted platform can happen due to the product transitioning from an angled product tray into a horizontal platform base. Although bottled items can have different weights, dimensions, and characteristics, the various embodiments of the present disclosure provide for gates that, in a closed position, hold products and then suddenly release and drop the products into a dispensing mechanism such as the tilted platform 342, allowing products to slide straight into the dispensing mechanism. A tilted platform, such as tilting platform 342, allows the product to follow the path of motion of a falling product (e.g., a box), eliminating the tilting and bridging.

Figure 4A:
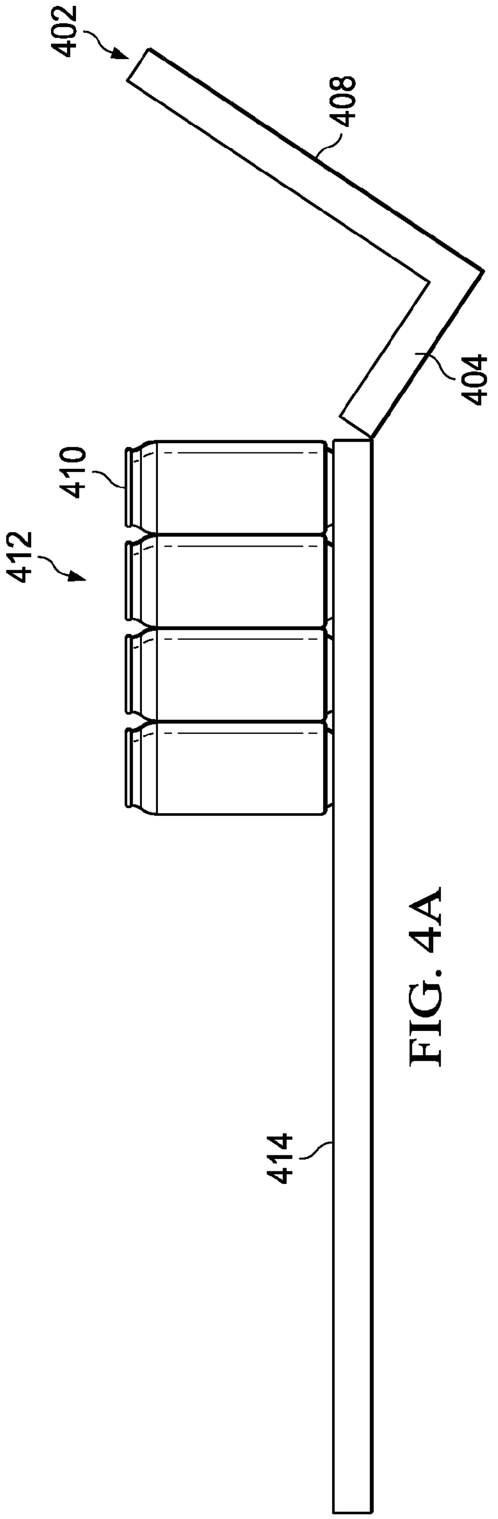
FIG. 4A illustrates a tilting platform in a position to receive a product from a product tray according to embodiments of the present disclosure.
Figure 4B:
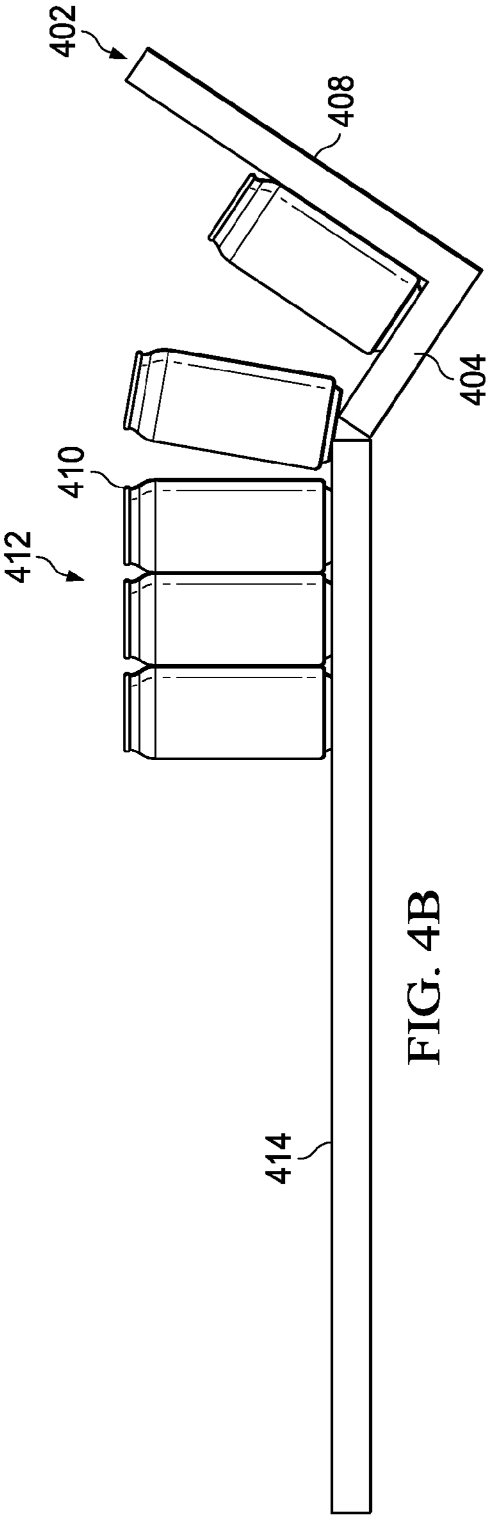
FIG. 4B illustrates a tilting platform in receipt of a product from a product tray according to embodiments of the present disclosure.

FIGS. 4A and 4B illustrate a tilting platform 402 according to embodiments of the present disclosure. Tilting platforms can come in a wide variety of configurations, and FIGS. 4A and 4B do not limit the scope of the present disclosure to any particular implementation of a tilting platform. The tilting platform 402 could be used with the vending machine 100 as shown in FIG. 1, or the vending machine 200 as shown in FIG. 2.

FIG. 4A illustrates a tilting platform 402 in a position to receive a product from a product tray according to embodiments of the present disclosure. FIG. 4B illustrates a tilting platform 402 in receipt of a product from a product tray according to embodiments of the present disclosure.

The tilting platform 402 has a shelf or "L" bracket that can be referred to as a base 404 of the tilting platform 402. The tilting platform 402 can tilt out from an initial position (not shown) to a tilted position 408 to accept a product 410 from a plurality of products 412 included on a product tray 414. The initial position can be, for example, a vertical position (such as shown in FIGS. 2 and 3B). To move the base 404 of the tilting platform 402 into the tilted position 408, the base 404 can move out towards the product tray 414 into the tilted position 408. The tilted position 408 can also be referred to as a receiving position according to the present disclosure.

The angle of the base 404 in the tilted position 408 in some embodiments can be lower than that of the angle of the column and product tray 414, or the portion of the column located nearest to the base. For example, the angle of the base 404 can be near 45 degrees from the product tray 414, as shown in FIGS. 4A and 4B. This angle of the tilting platform 402 when in the tilted position 408 causes the product 410 to fall into the tilting platform without any tilting of the top of the product 410 against the tilting platform 402 or any bridging of the product 410. The tilting platform 402 then can return to the initial position for delivery of the product. In some embodiments, the tilting platform 402 travels to near an access port, such as access port 105, to deposit the product 410 into the access port to allow a user to retrieve the product 410. It will be understood that other titled platforms disclosed herein such as tilted platforms 322 and 342 can also move to a position similar to tilted position 408 as shown in FIGS. 4A and 4B, depending on the needs of the system and the types of products to be dispensed, such as bagged food items or bottled drink items.

FIGS. 5A-5J illustrate a tilting platform apparatus 500 according to embodiments of the present disclosure. Tilting platform apparatuses can come in a wide variety of configurations, and FIGS. 5A-5J do not limit the scope of the present disclosure to any particular implementation of a tilting platform apparatus. The tilting platform apparatus 500 could be used with the vending machine 100 as shown in FIG. 1, or the vending machine 200 as shown in FIG. 2.

Figure 5C:
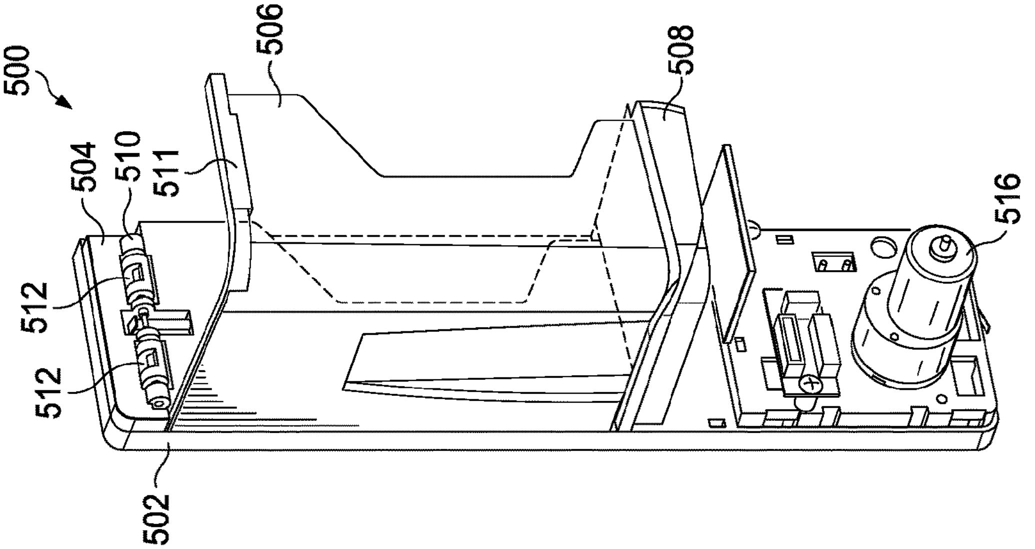
FIG. 5C illustrates a rear perspective view of a tilting platform apparatus in an initial position with a bottom cover removed exposing a motor according to embodiments of the present disclosure.
Figure 5B:
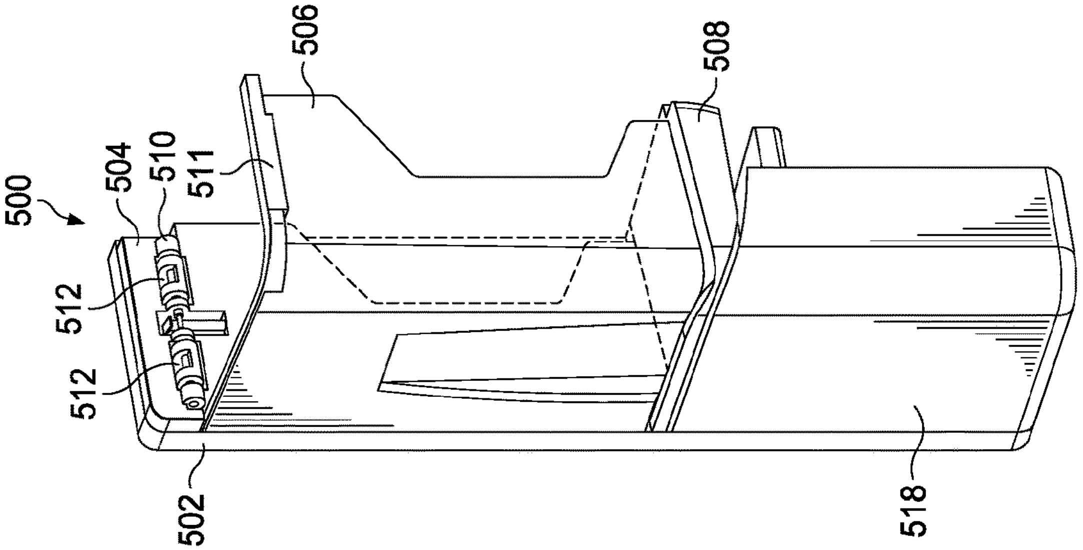
FIG. 5B illustrates a rear perspective view of a tilting platform apparatus in an initial position according to embodiments of the present disclosure.
Figure 5A:
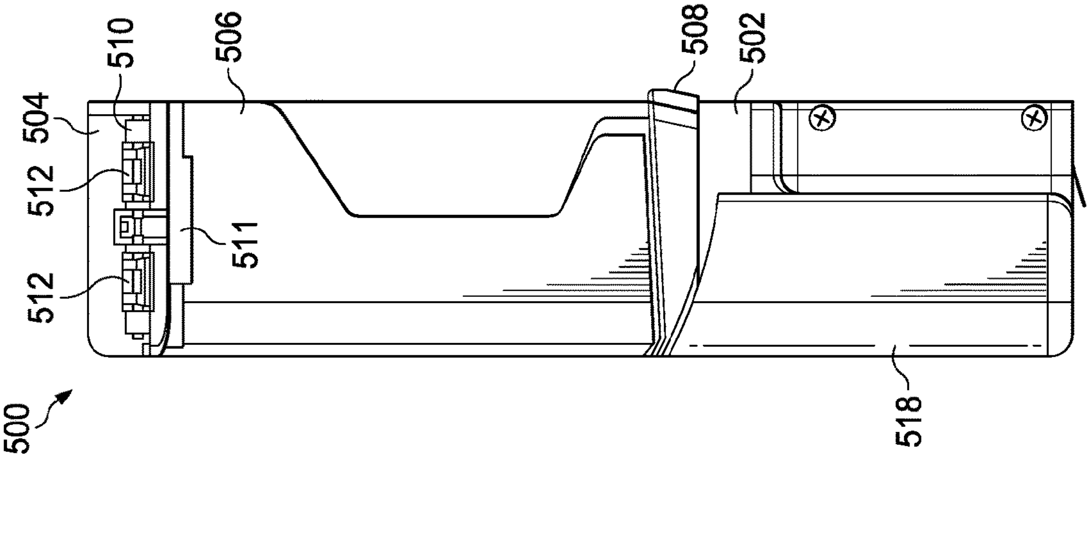
FIG. 5A illustrates a side view of a tilting platform apparatus in an initial position according to embodiments of the present disclosure.
Figure 5F:
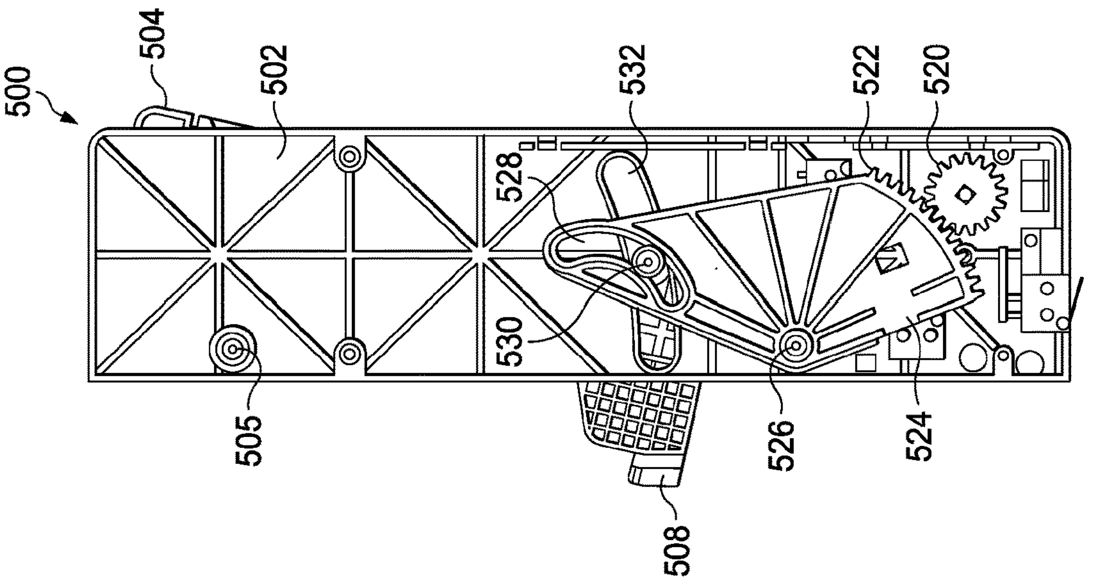
FIG. 5F illustrates a cross sectional view of a tilting platform apparatus in a mid-way position according to embodiments of the present disclosure.
Figure 5E:
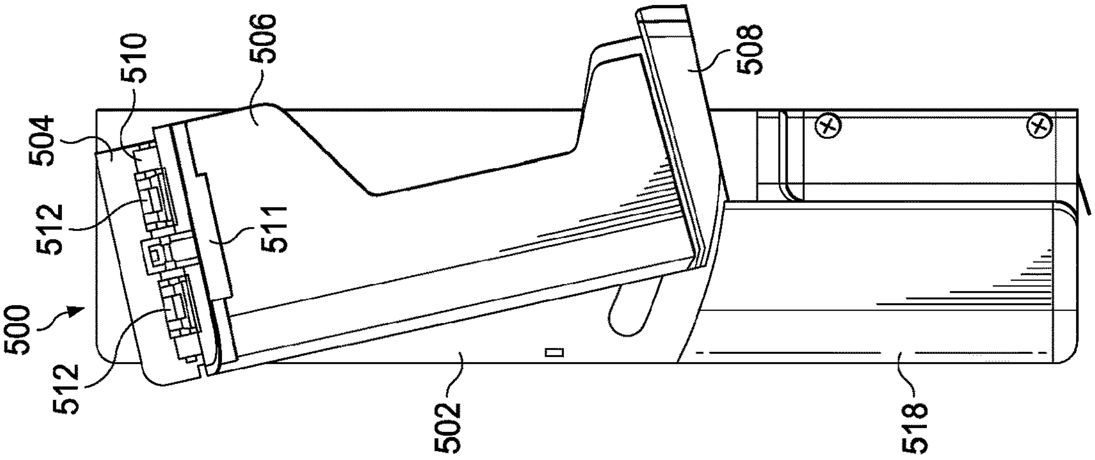
FIG. 5E illustrates a side view of a tilting platform apparatus in a mid-way position according to embodiments of the present disclosure.
Figure 5D:
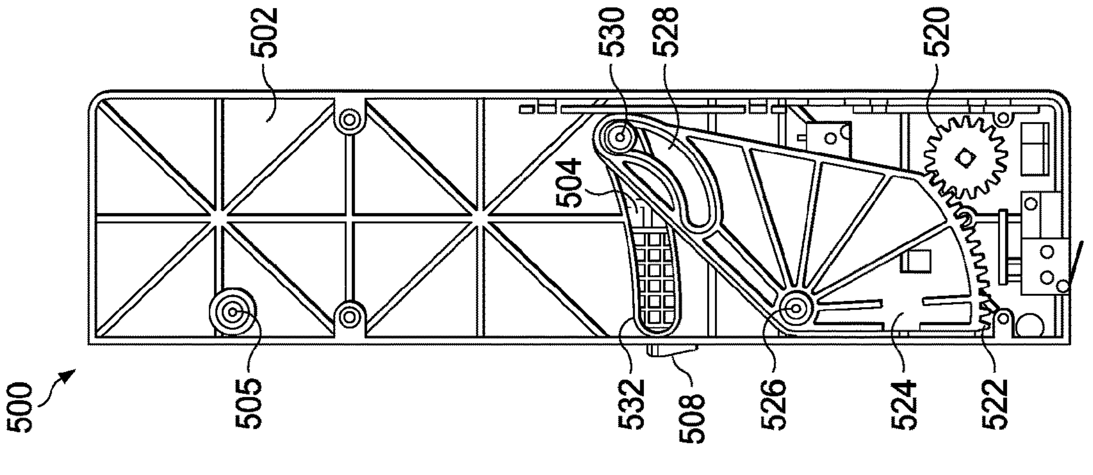
FIG. 5D illustrates a cross sectional view of a tilting platform apparatus in an initial position according to embodiments of the present disclosure.
Figure 5H:
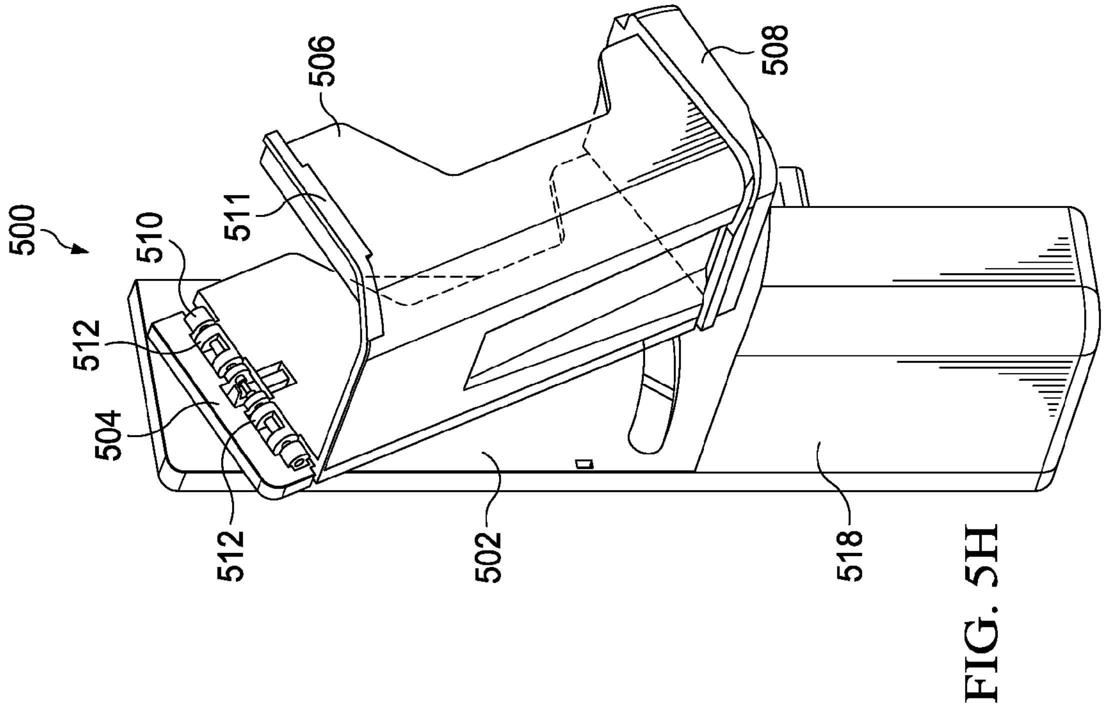
FIG. 5H illustrates a rear perspective view of a tilting platform apparatus in a retrieval position according to embodiments of the present disclosure.
Figure 5G:
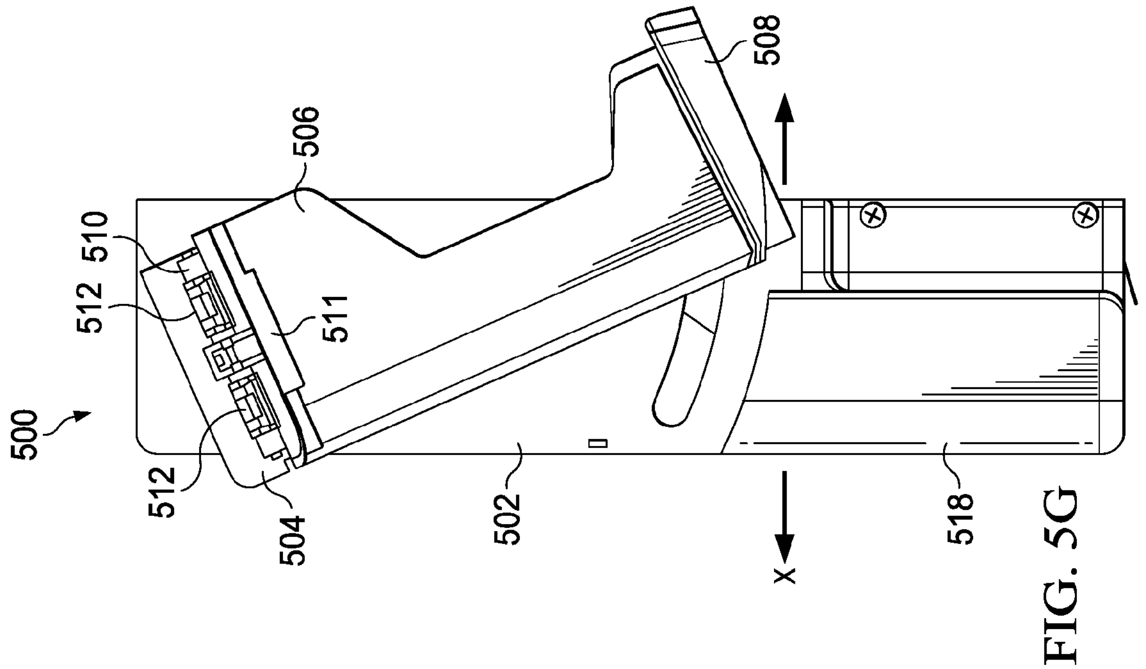
FIG. 5G illustrates a side view of a tilting platform apparatus in a retrieval position according to embodiments of the present disclosure.
Figure 5J:
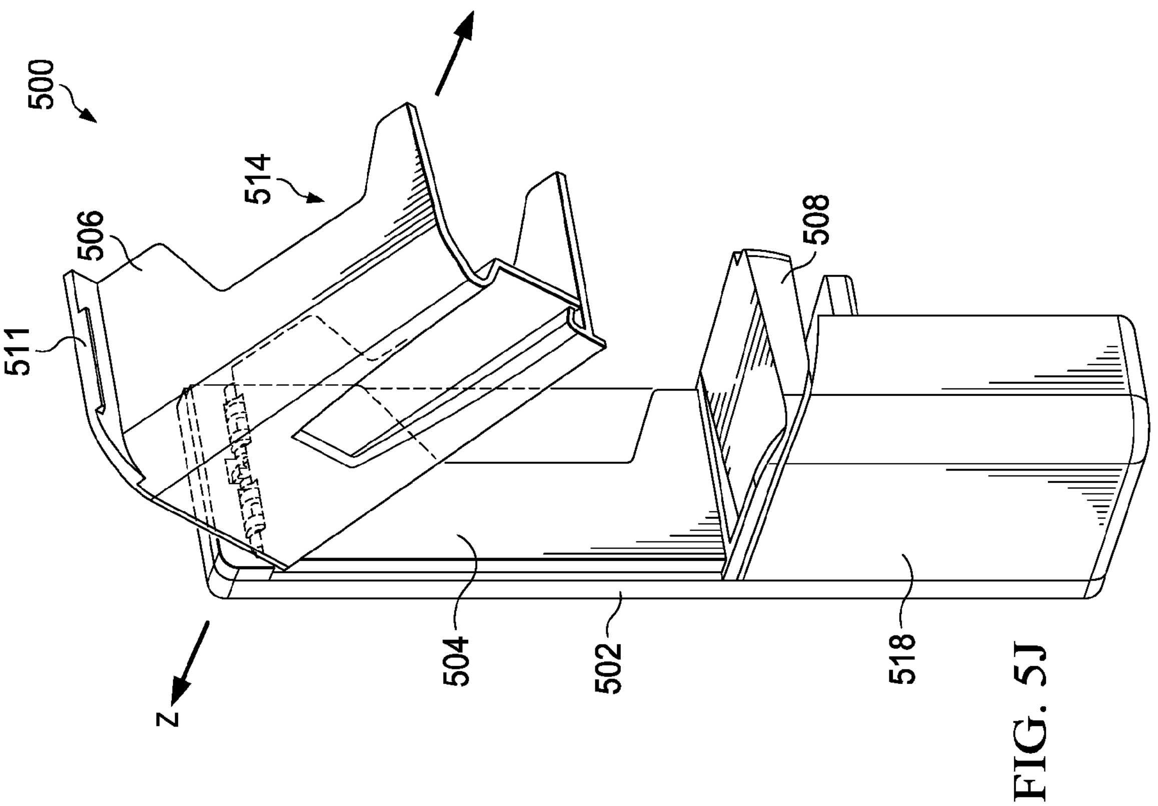
FIG. 5J illustrates a rear perspective view of a tilting platform apparatus in a product ejection position according to embodiments of the present disclosure.
Figure 5I:
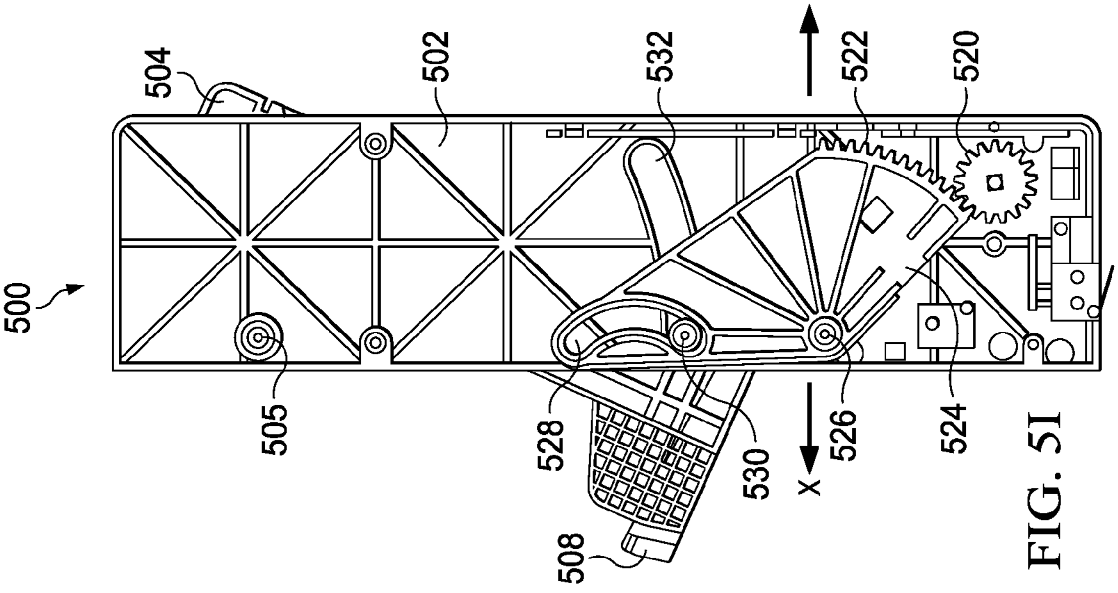
FIG. 5I illustrates a cross sectional view of a tilting platform apparatus in a retrieval position according to embodiments of the present disclosure.

FIG. 5A illustrates a side view of the tilting platform apparatus 500 in an initial position, FIG. 5B illustrates a rear perspective view of the tilting platform apparatus 500 in the initial position, FIG. 5C illustrates a rear perspective view of the tilting platform apparatus 500 in the initial position with a bottom cover removed exposing a motor; and FIG. 5D illustrates a cross sectional view of the tilting platform apparatus 500 in the initial position. FIG. 5E illustrates a side view of the tilting platform apparatus 500 in a mid-way position and FIG. 5F illustrates a cross sectional view of the tilting platform apparatus 500 in the mid-way position. FIG. 5G illustrates a side view of the tilting platform apparatus 500 in a retrieval position, FIG. 5H illustrates a rear perspective view of the tilting platform apparatus 500 in the retrieval position, and FIG. 5I illustrates a cross sectional view of the tilting platform apparatus 500 in the retrieval position. FIG. 5J illustrates a rear perspective view of the tilting platform apparatus 500 in a product ejection position.

The tilting platform apparatus 500 includes a frame 502 on which a plate 504 is rotatably coupled at a pivot point 505. A product catch 506 resides next to the plate 504 with a bottom of the product catch 506 disposed on top of a surface 508. In some embodiments, the frame 502 may be coupled to a movable stage, such as movable stage 219. In some embodiments, the product catch 506 may be directly or indirectly coupled to the movable stage. The connection to the plate 504 can constrain the motion of the surface 508. This allows the product catch 506 to travel with the plate 504 and the surface 508. The product catch 506 can be rectangular in shape with three sides closed and one open side for receiving a product from a tray in a vending machine. The product catch 506 can be transparent in some embodiments to allow a user of the vending machine to see the drink being delivered through the product catch 506. However, in other embodiments, the product catch 506 could be opaque.

The plate 504 includes a hinge 510 near a top of the plate 504. Tabs 512 of the product catch 506 are installed on the hinge 510. A ledge 511 at the top of the product catch 506 opposite the hinge 510 can come into contact with a wall or other component within the vending machine as the tilting platform apparatus travels down towards an access port, such as access port 105. When the ledge 511 comes into contact with a wall or other component in the vending machine the tabs 512 of the product catch 506 rotate around the hinge 510, rotating the product catch 506 out and away from the surface 508 to a product ejection position 514. The product ejection position 514 causes a product to be swept off the surface 508, where a bottom of the product is resting, by the product catch 506 and into an access port, such as access port 105, for retrieval by a user of the vending machine. In other embodiments, the product catch 506 extends out from the frame 502 without rotating, in order to deliver the product to the access port. For example, the product catch 506 can have an extendable arm coupled between the product catch 506 and the frame 502, or another component of the tilting platform apparatus 500. The extendable arm may, by operation of the motor or another mechanism, extend horizontally from the tilting platform apparatus 500 such that the product catch 506 slides sideways, without rotating, off the surface 508 and out over the access port, causing the product to be swept off the surface 508 and into the access port.

The tilting platform apparatus 500 further includes a rotation motor 516 that can be enclosed within a housing 518 in a bottom portion of the tilting platform apparatus 500 that is below the surface 508. The rotation motor 516 rotates a gear 520 that meshes with teeth 522 of a hinged plate 524, as illustrated in FIGS. 5D, 5F, and 5I. The hinged plate 524 includes a pivot point 526 near a front of the tilting platform apparatus 500. The pivot point 526 can be a hole in the hinged plate 524 through which a bolt or other fixation device can be installed. The hinged plate 524 also includes a curved slot 528 near a top of the hinged plate 524 through which another fixation device 530 is installed. The fixation device 530 is also installed through a frame slot 532 of the frame 502 of the tilting platform apparatus 500. The fixation device 530 is connected between the hinged plate 524 and the plate 504 on the other side of the frame 502, with the fixation device 530 traveling through the curved slot 528 of the hinged plate 524 and through the frame slot 532. In some embodiments, the fixation device 530 can be connected to the surface 508.

As the rotation motor 516 rotates the gear 520 meshed with the teeth 522, the hinged plate 524 rotates around the pivot point 526, while the fixation device 530 moves within both the curved slot 528 and the frame slot 532, pushing the plate 504 forward and causing the plate 504 to rotate around the pivot point 505. In other embodiments, the tilting platform apparatus 500 may slide forward instead of rotating. For example, the motor may instead push the surface 508 or the plate 504 forward at or near pivot point 505 or at or near the frame slot 532. For instance, the frame slot 532 may be a horizontal slot rather than a curved slot, with the fixation device 530 sliding forward through the horizontal slot such that the platform moves forward rather than rotating. FIGS. 5A-5D illustrates the plate 504 in an initial position. The initial position allows for a product to rest on the surface 508 and travel with the tilting platform apparatus 500, and the initial position also allows the tilting platform apparatus 500 to travel through a vending machine without coming into contact with other components in the vending machine. The plate 504 rotates from the initial position to a retrieval position, as illustrated in FIGS. 5G-5I, passing a mid-way position as illustrated in FIGS. 5E and 5F. As illustrated in FIG. 5I, to move to the retrieval position, the hinged plate 524 rotates forward, with the teeth 522 traveling across the gear 520 until reaching an end of the teeth 522. At the retrieval position, the surface 508 can contact a release mechanism such as release mechanisms **202*a* . . . 202*n* of FIG. 2. Depressing the release mechanism releases a product onto the surface 508. The plate 504 can then be rotated back to the initial position, now holding a product for delivery to a user of the vending machine. The hinged plate 524 provides for product retrieval that is configured to rotate about an X-axis while the hinge 510** rotates about a Z-axis.

FIGS. 6A-6D illustrate a product retrieval mechanism 600 according to embodiments of the present disclosure. Product retrieval mechanisms can come in a wide variety of configurations, and FIGS. 6A-6D do not limit the scope of the present disclosure to any particular implementation of a product retrieval mechanism. The product retrieval mechanism 600 could be used with the vending machine 100 as shown in FIG. 1, or the vending machine 200 as shown in FIG. 2.

Figure 6A:
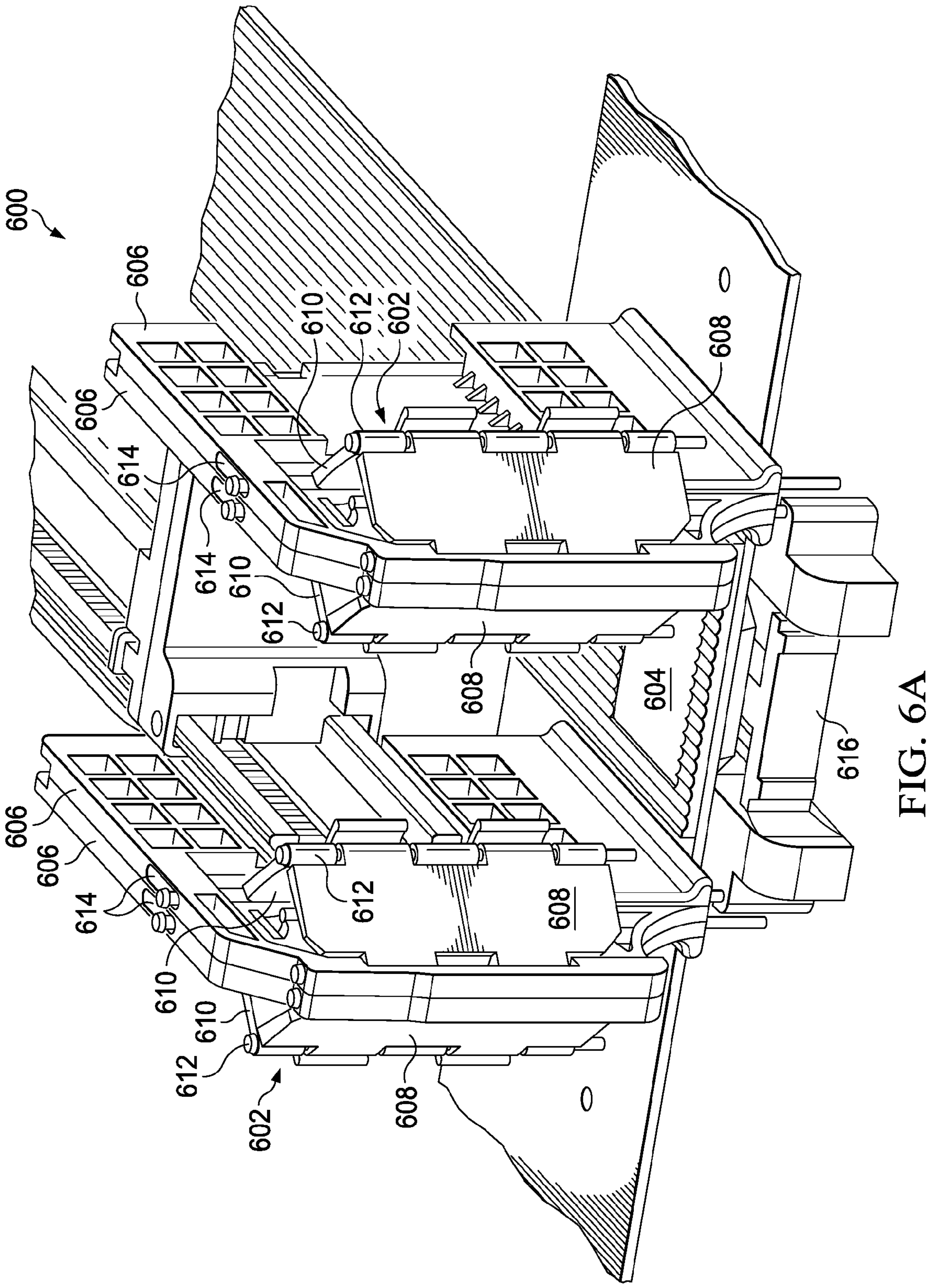
FIG. 6A illustrates a front perspective view of a product retrieval mechanism in a closed position according to embodiments of the present disclosure.
Figure 6B:
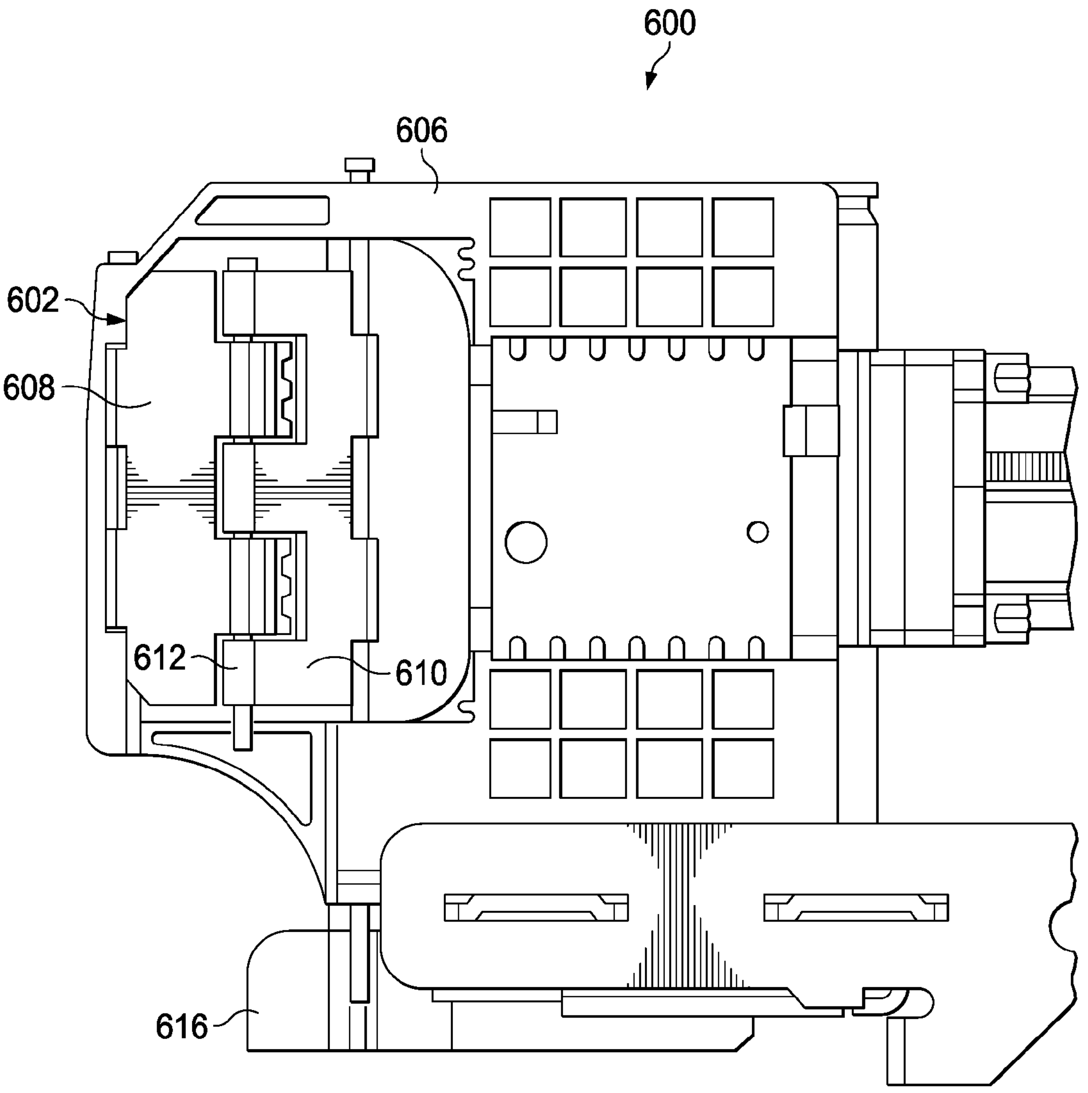
FIG. 6B illustrates a side view of a product retrieval mechanism in a closed position according to embodiments of the present disclosure.
Figure 6C:
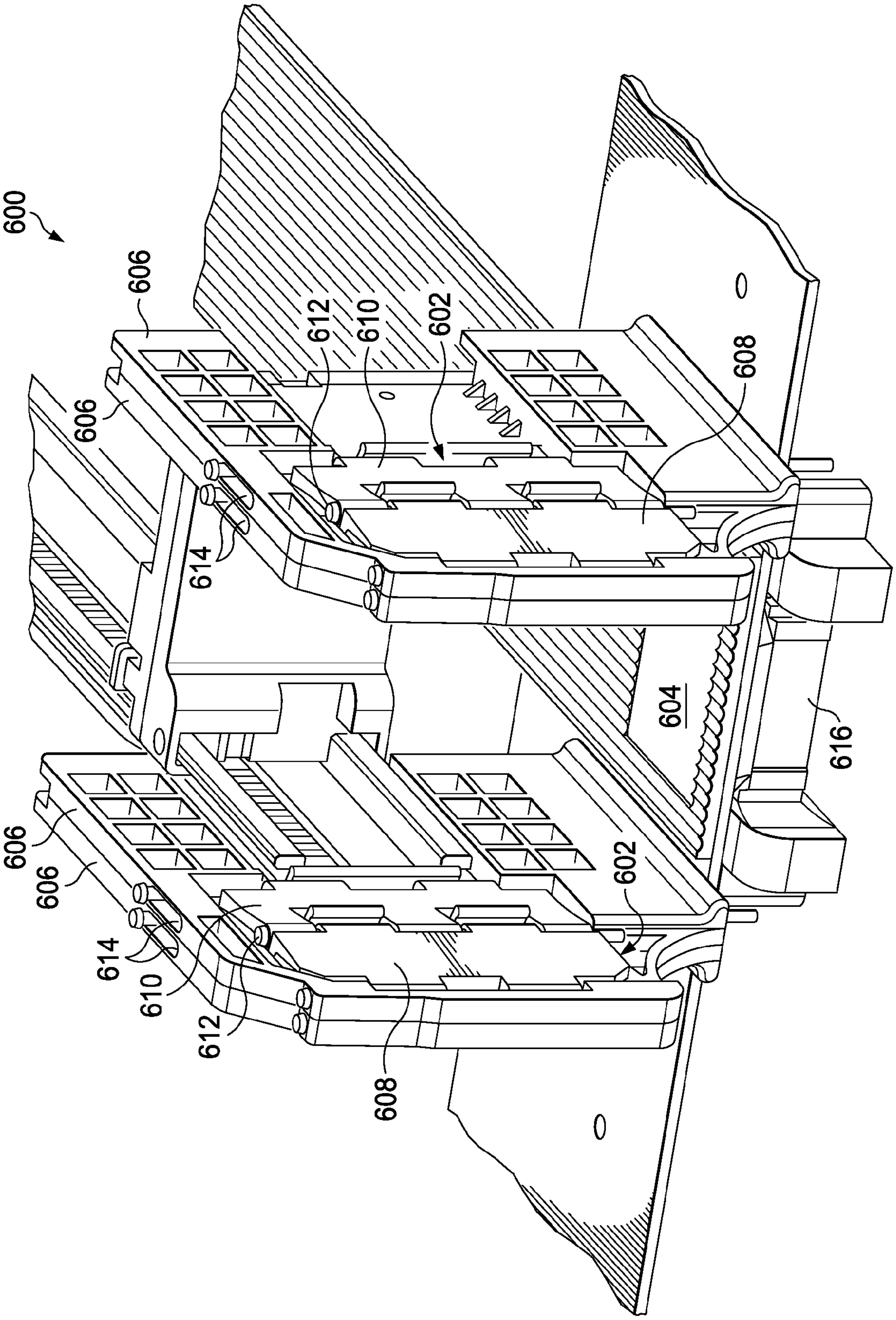
FIG. 6C illustrates a front perspective view of a product retrieval mechanism in an open position according to embodiments of the present disclosure.
Figure 6D:
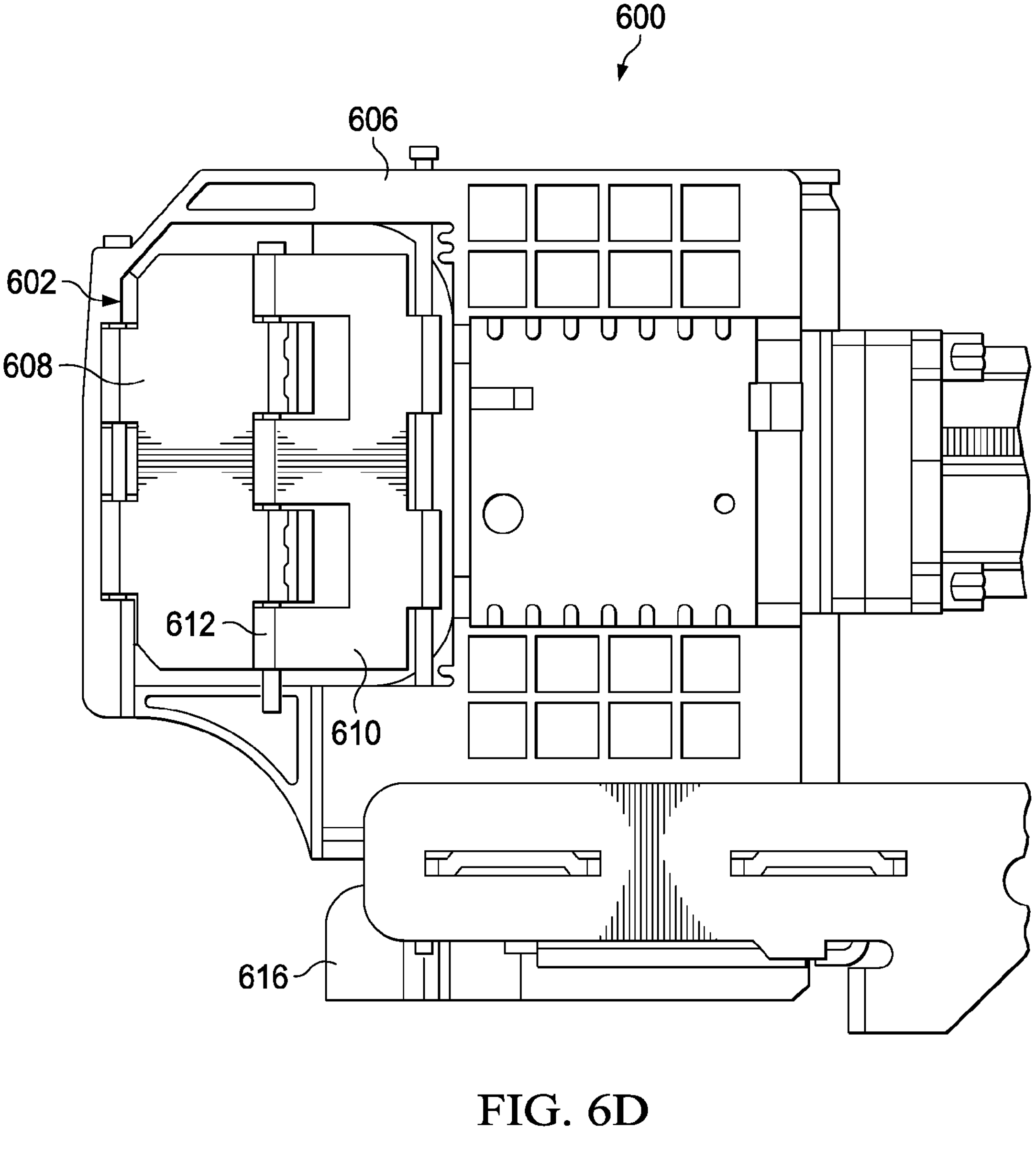
FIG. 6D illustrates a side view of a product retrieval mechanism in an open position according to embodiments of the present disclosure.

FIG. 6A illustrates a front perspective view of a product retrieval mechanism 600 in a closed position according to embodiments of the present disclosure. FIG. 6B illustrates a side view of the product retrieval mechanism 600 in the closed position according to embodiments of the present disclosure. FIG. 6C illustrates a front perspective view of the product retrieval mechanism 600 in the open position according to embodiments of the present disclosure. FIG. 6D illustrates a side view of the product retrieval mechanism 600 in the open position according to embodiments of the present disclosure.

The product retrieval mechanism 600 includes gates 602. The gates 602 serve to restrict products stored on a product column or a tray 604 from falling off the tray 604. The products can stand in a row between brackets 606, as the products move towards the end of the tray 604. Each of the gates 602 is installed on one of the brackets 606. Each of the gates 602 includes a first panel 608 and a second panel 610 connected by a hinge 612. The first panel 608 can be fixed to the front of one of the brackets 606 and the second panel can be slidably fixed to a top of the bracket through one or more slots 614. A release mechanism 616 (e.g., a button) is disposed in an open space in the tray 604 and below the gates 602 and the brackets 606.

A tilted platform base, such as surface 508 of FIGS. 5A-5J, can depress the release mechanism 616 to open the gates 602. When the release mechanism 616 is depressed (i.e., activated), the gates 602 can move from a closed position shown in FIGS. 6A and 6B to an open position shown in FIGS. 6C and 6D to allow product vending. The gates move between the closed position and the open position by extending down a length of the brackets 606, and through the slots 614, causing the panels 608 and 610 to press inward via the hinge 612 towards the brackets 606 and away from products on the tray 604. Thus, in the open position, the gates 602 flatten, allowing a product to escape and fall into a tilting platform. In various embodiments, the tilting platform can rotate forward to depress the release mechanism 616 and open the gates 602. In various embodiments, a shelf that is moved by a gear can extend outward to activate (i.e., depress) the release mechanism 616. In different embodiments, the mechanism restraining the product can be, in addition to a gate, cylindrical barriers, bars, rotational containers, and other types of barriers.

Figure 7A:
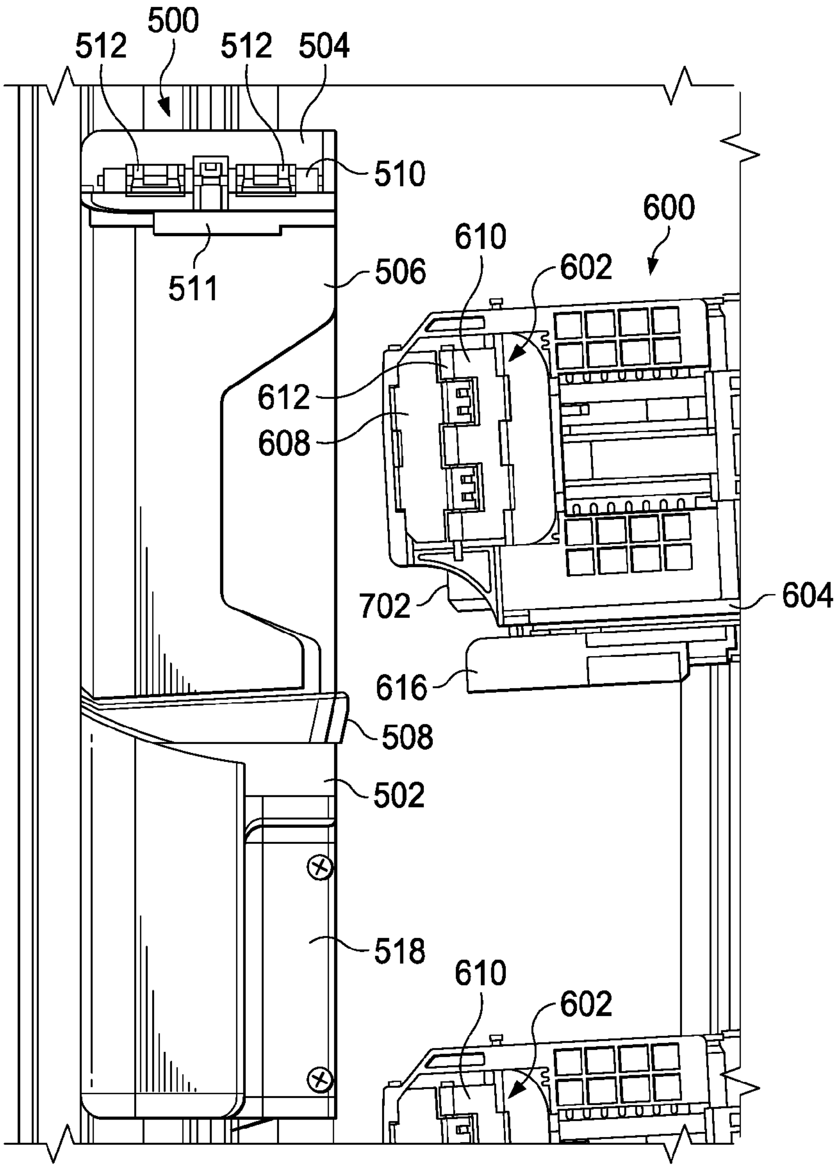
FIG. 7A illustrates a side view of a tilting platform apparatus in an initial position before interacting with a product retrieval mechanism according to embodiments of the present disclosure.
Figure 7B:
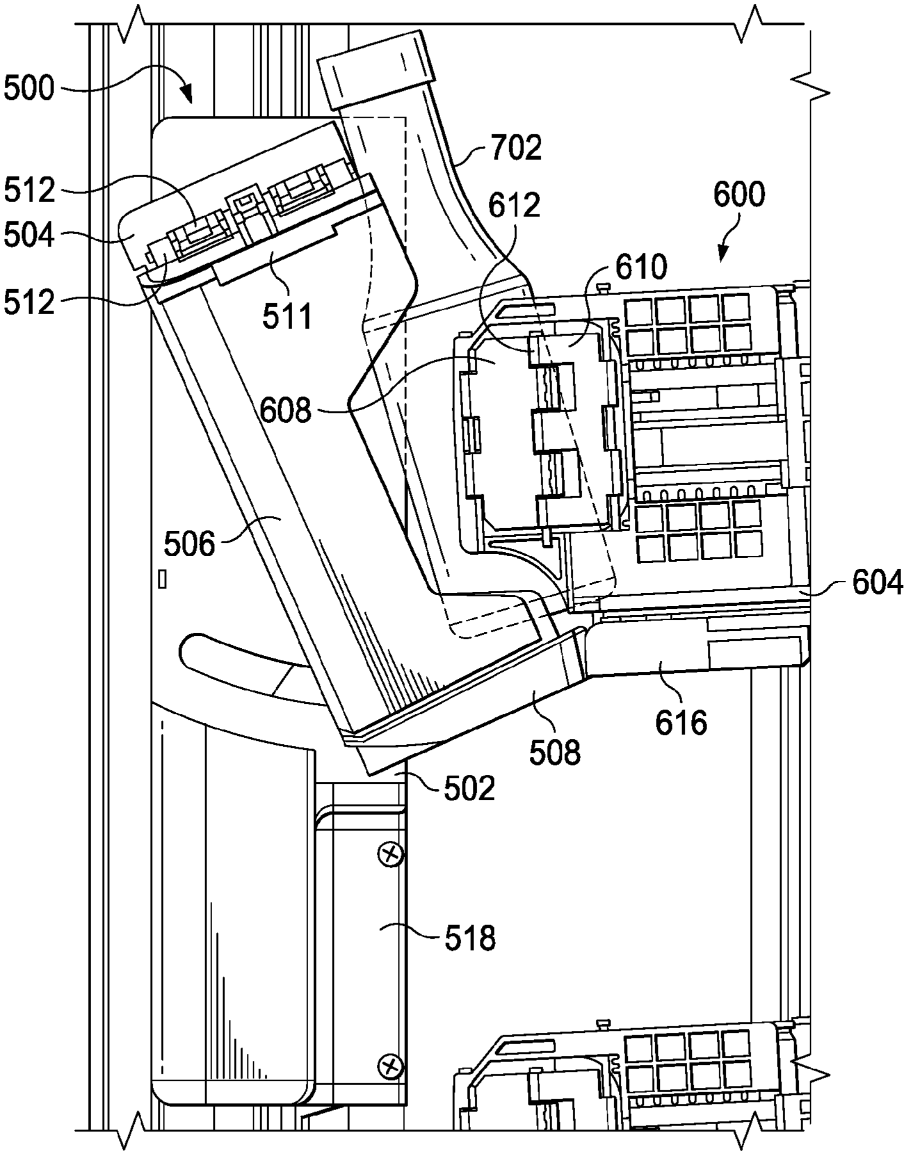
FIG. 7B illustrates a side view of a tilting platform apparatus in product retrieval position interacting with a product retrieval mechanism according to embodiments of the present disclosure.

FIGS. 7A and 7B illustrate the tilting platform apparatus 500 interacting with product retrieval mechanism 600 according to embodiments of the present disclosure. Tilting platform apparatuses and product retrieval mechanisms can come in a wide variety of configurations, and FIGS. 7A and 7B do not limit the scope of the present disclosure to any particular implementation of a tilting platform apparatus or product retrieval mechanism. The tilting platform apparatus 500 and the product retrieval mechanism 600 could be used with the vending machine 100 as shown in FIG. 1, or the vending machine 200 as shown in FIG. 2. It should be understood that other titling platforms and product retrieval mechanisms provided by the present disclosure can be substituted into the vending machine illustrated in FIGS. 7A and 7B.

FIG. 7A illustrates a side view of the tilting platform apparatus 500 in an initial position before interacting with the product retrieval mechanism 600 according to embodiments of the present disclosure. FIG. 7B illustrates a side view of the tilting platform apparatus 500 in product retrieval position interacting with the product retrieval mechanism 600 according to embodiments of the present disclosure.

As illustrated in FIG. 7A, the tilting platform apparatus 500 in the initial position can move in front of a tray 604 containing one or more products 702. The one or more products 702 can be held on the tray 604 by the gates 602. As illustrated in FIG. 7B, when the plate 504 is rotated against the frame 502 as described in the present disclosure, the surface 508 comes into contact with and depresses the release mechanism 616, causing the gates 602 to open, releasing one of the one or more products 702. The one of the one or more products 702 falls onto the surface 508, and is surrounded by the product catch 506 on three sides, to keep the product securely on the surface 508 while the tilting platform apparatus travels through the vending machine to dispense the one of the one or more products 702 to a user of the vending machine. Dispensing the product 702 can be performed by the tilting platform apparatus 500 moving to the ejection position as shown in FIG. 5J to drop the product into an access port, such as access port 105.

Figure 8A:
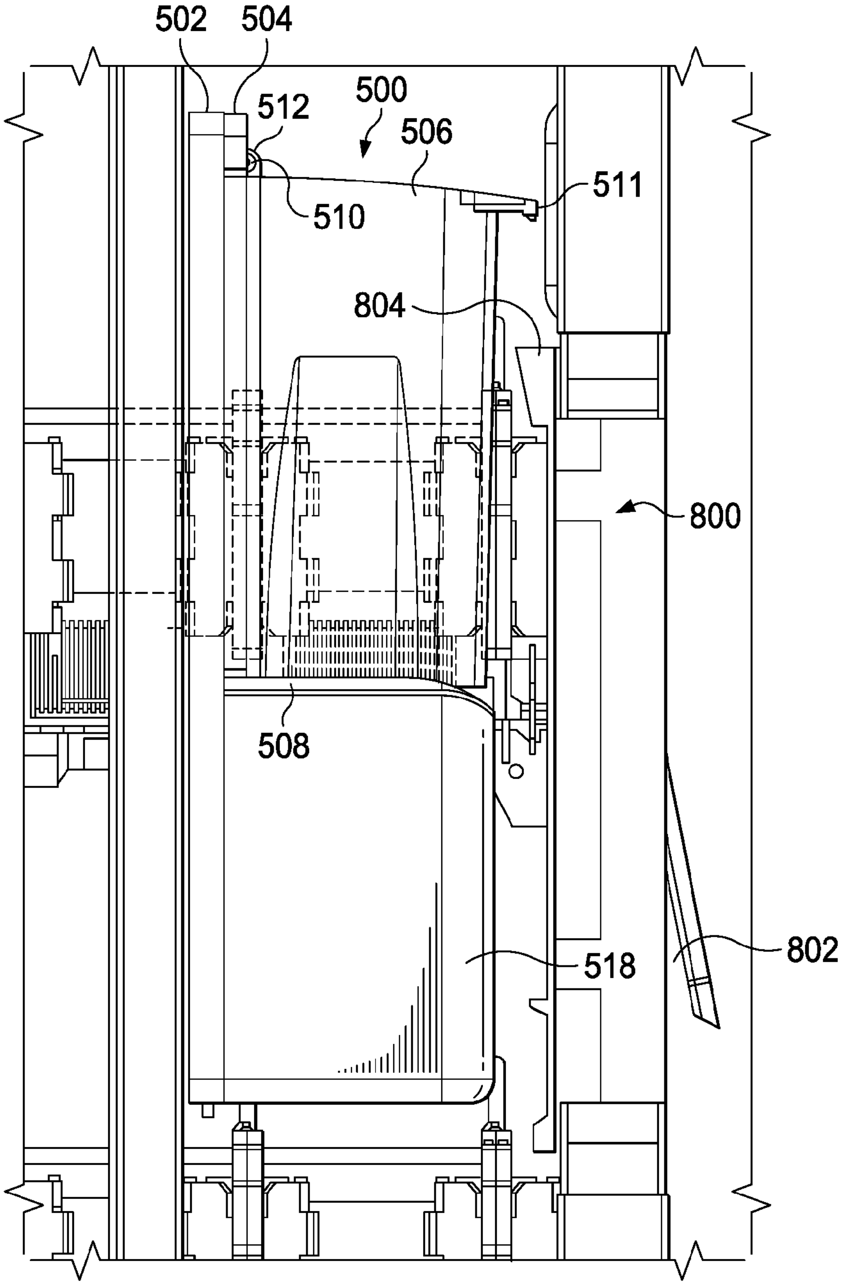
FIG. 8A illustrates a rear view of a tilting platform apparatus positioned above a discharge frame according to embodiments of the present disclosure.
Figure 8B:
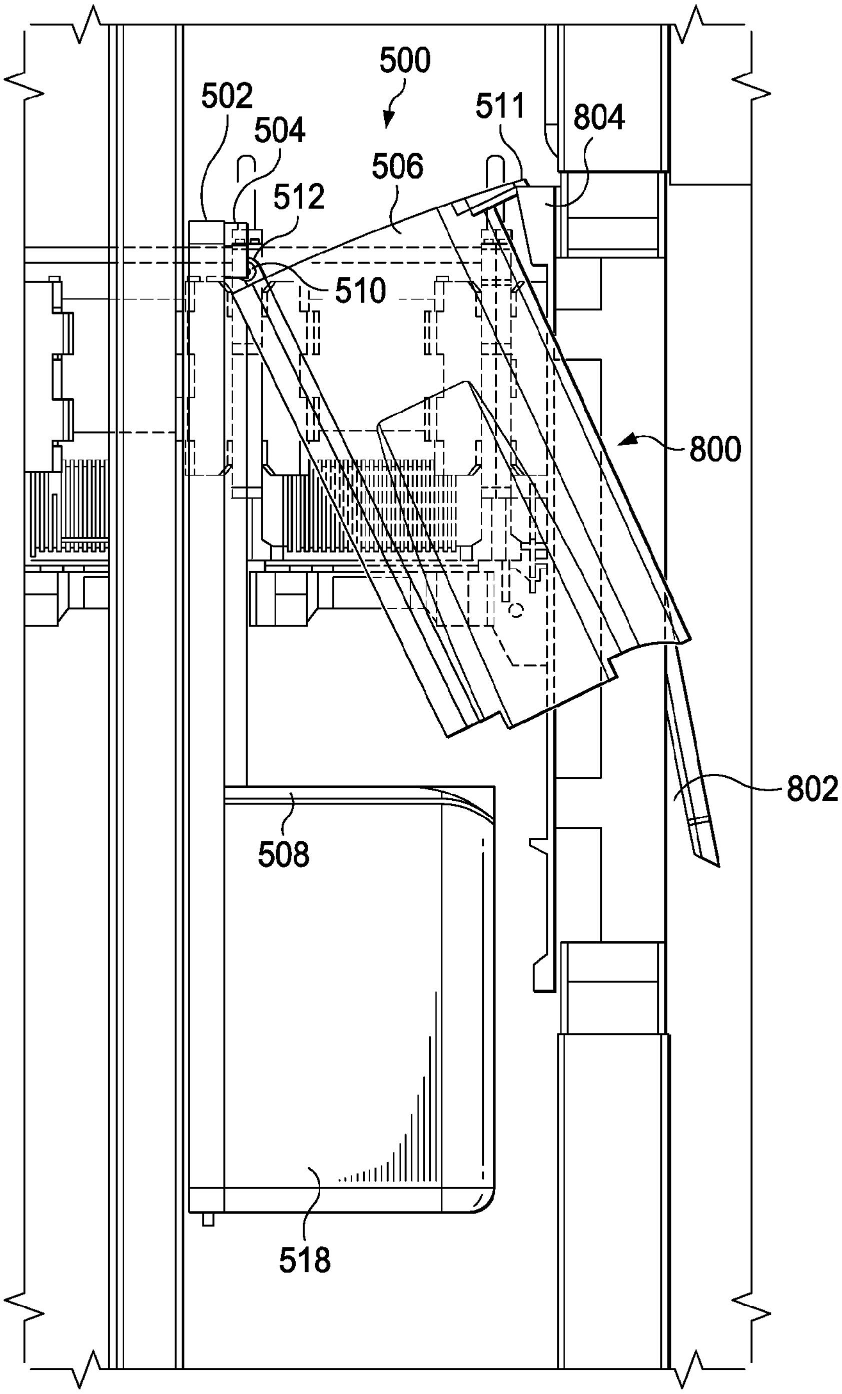
FIG. 8B illustrates a rear view of a tilting platform apparatus engaging a discharge frame according to embodiments of the present disclosure.

FIGS. 8A and 8B illustrate the tilting platform apparatus 500 engaging a discharge frame 800 according to embodiments of the present disclosure. Discharge frames can come in a wide variety of configurations, and FIGS. 8A and 8B do not limit the scope of the present disclosure to any particular implementation of a discharge frame. The discharge frame 800 could be used with the vending machine 100 as shown in FIG. 1, or the vending machine 200 as shown in FIG. 2.

FIG. 8A illustrates a rear view of the tilting platform apparatus 500 positioned above a discharge frame 800 according to embodiments of the present disclosure. FIG. 8B illustrates a rear view of the tilting platform apparatus 500 engaging the discharge frame 800 according to embodiments of the present disclosure.

The discharge frame 800 is disposed at a location in a vending machine near an access port 802. The discharge frame 800 includes a discharge ledge 804 secured to a wall of the vending machine. As the tilting platform apparatus 500 moves down towards the discharge frame 800, the ledge 511 of the product catch 506 comes into contact with the discharge ledge 804, causing the product catch 506 to rotate via the tabs 512 secured around the hinge 510. The rotation of the product catch 506 causes the product catch 506 to rotate up and away from the surface 508, where a product can be resting, into the product ejection position. The rotation thus causes the side of the product catch 506 that is near the plate 504 to come into contact with a product and push the product off the surface 508 and into the access port 802. The tilting platform apparatus 500 can then move back up, causing the ledge 511 to cease contacting the discharge ledge 804. Once the ledge 511 ceases contact with the discharge ledge 804, the product catch 506 can then rotate back to the initial position.

Figure 9:
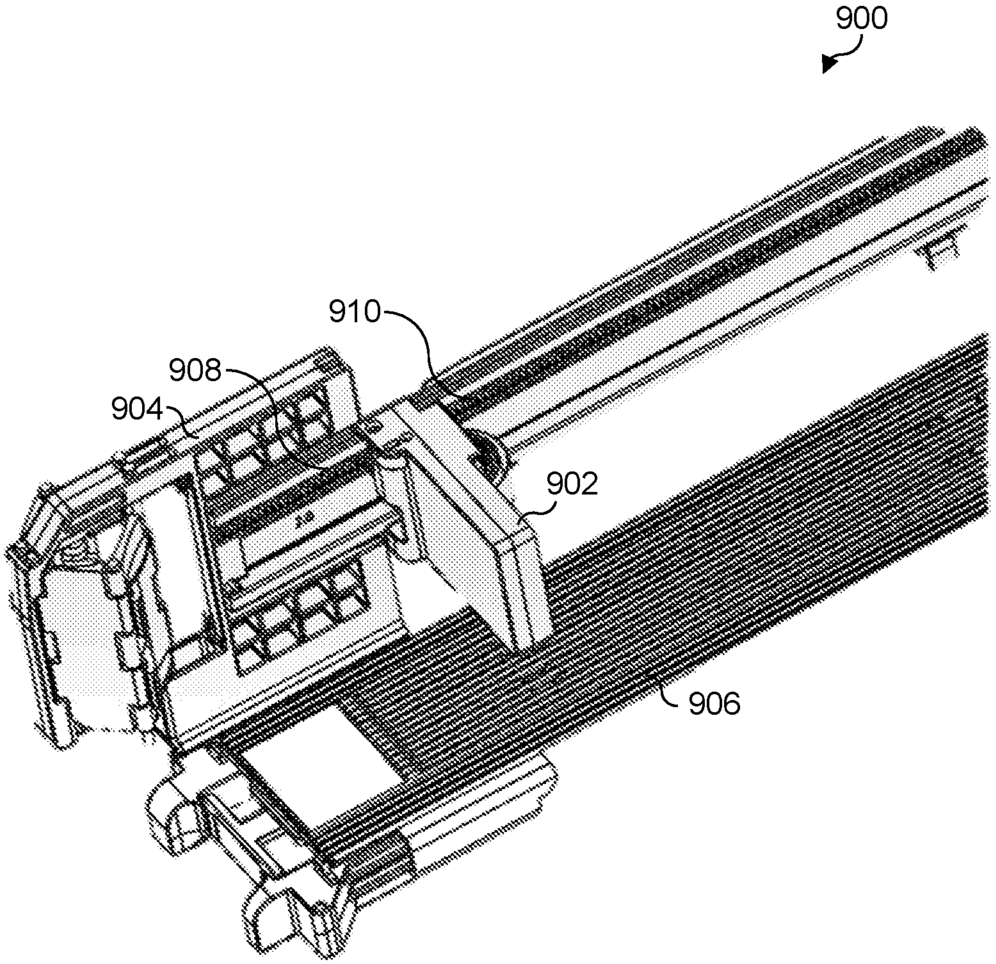
FIG. 9 illustrates a side mounted damper assembly according to embodiments of the present disclosure.

FIG. 9 illustrates a side mounted damper assembly 900 according to embodiments of the present disclosure. Damper assemblies can come in a wide variety of configurations, and FIG. 9 does not limit the scope of the present disclosure to any particular implementation of a damper assembly. The damper assembly 900 could be used with the vending machine 100 as shown in FIG. 1, or the vending machine 200 as shown in FIG. 2.

The damper assembly 900 includes a pusher plate 902 installed on a bracket or sidewall 904 of a product tray 906. The pusher plate 902 can have a spring installed thereon to provide a movement force to the pusher plate 902. The sidewall 904 can also include a recessed lane 908 having a rack geometry 910 that includes teeth oriented into the recessed lane 908. Sides of a gear damper within the pusher plate 902 can be disposed within the recessed lane 908 such that teeth of the gear damper face, and mesh with, the teeth of the rack geometry 910. The pusher plate 902 extends sideways from the sidewall 904 such that the pusher plate 902 is disposed above the product tray 906. As the pusher plate 902 travels along the sidewall 904, the pusher plate 902 contacts products on the product tray 906 to push the products towards a front of the product tray 906 for dispensing within a vending machine. The damper assembly 900 provides constant force via the spring to push products along the product tray 906. In some embodiments, the product tray 906 can be disposed at a particular angle, such as three degrees, while the force of the pusher plate 902 can be increased by using a rotary damper, to help alleviate tipping of products on the product tray 906.

Figure 10A:
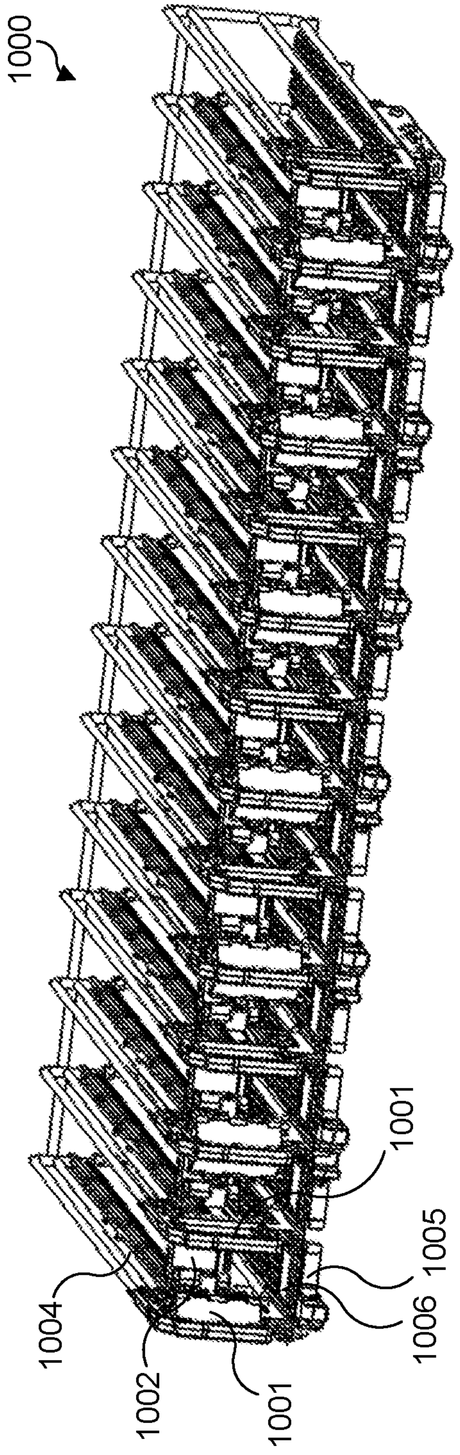
FIG. 10A illustrates a front perspective view of a shelf system according to embodiments of the present disclosure.
Figure 10B:
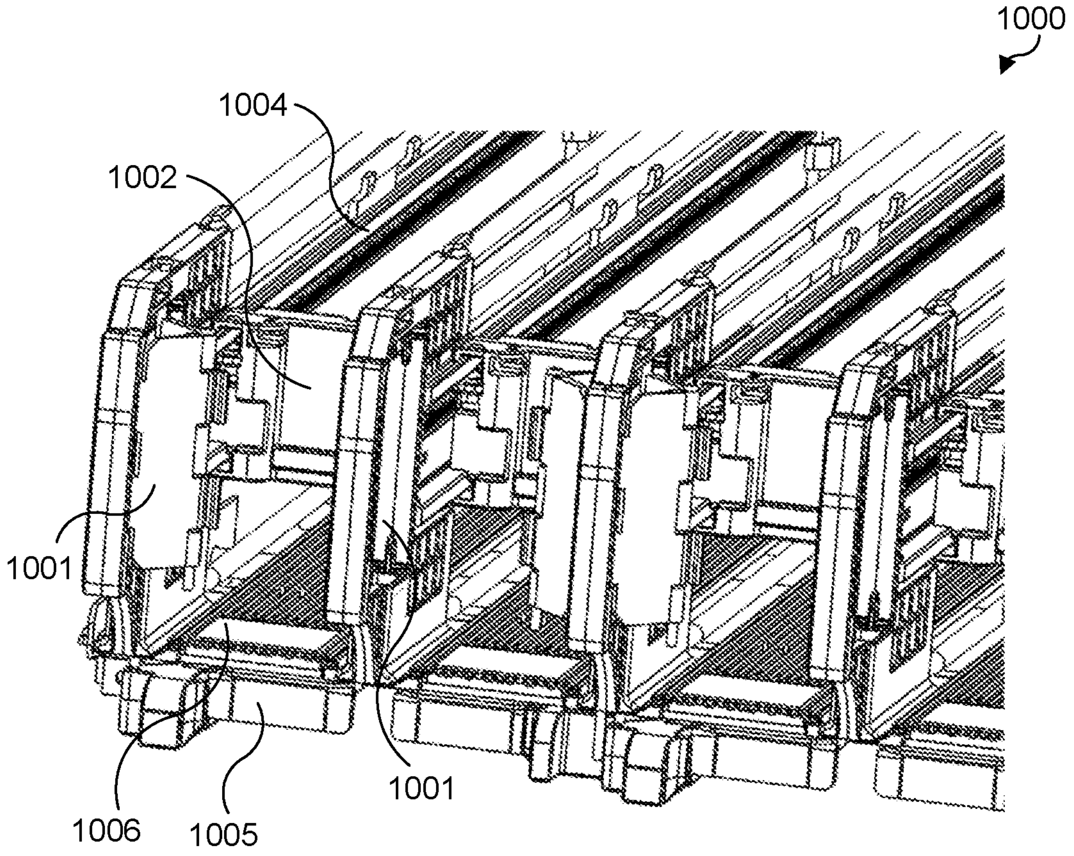
FIG. 10B illustrates an enlarged view of a portion of the shelf system according to embodiments of the present disclosure.
Figure 10C:
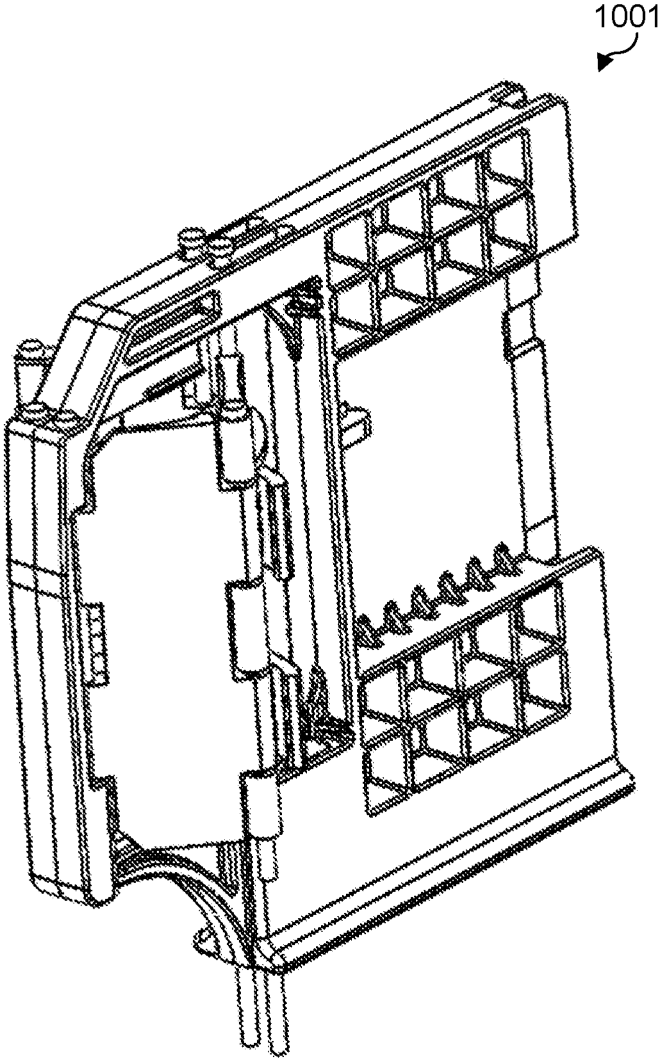
FIG. 10C illustrates a side perspective view of a product gate of a shelf system according to embodiments of the present disclosure.

FIGS. 10A-10C illustrates various views of a shelf system 1000 according to embodiments of the present disclosure. FIG. 10A illustrates a front perspective view of the shelf system 1000 according to embodiments of the present disclosure. FIG. 10B illustrates an enlarged view of a portion of the shelf system 1000 according to embodiments of the present disclosure. FIG. 10C illustrates a side perspective view of a product gate 1001 of the shelf system 1000 according to embodiments of the present disclosure. Vending machine shelf systems can come in a wide variety of configurations, and FIGS. 10A-10C do not limit the scope of the present disclosure to any particular implementation of a shelf system. The shelf system 1000 could be used with the vending machine 100 as shown in FIG. 1, or the vending machine 200 as shown in FIG. 2.

The shelf system 1000 includes a plurality of product gates 1001 and pusher plates 1002 as described herein, such as with respect to FIGS. 6A-6D and FIG. 9. Sidewalls 1004 separate shelf rows or trays 1006 from each other, with each shelf row 1006 operable to maintain a plurality of products. Each shelf row 1006 has a button 1005 for opening the product gates 1001 when a product retrieval platform presses the button 1005. As described in the various embodiments herein, when a product retrieval platform presses one of the buttons 1005, the corresponding product gates open to allow a frontmost product to be deposited into the product retrieval platform. Using a gate 1001 at the front of the product row 1006 that both opens to allow a product to be dispensed, and closes to catch and maintain remaining products in the product row 1006 prevents issues in other vending machines that use both a product release gate and a product catching gate. For example, using both a release gate and a catching gate can result in products being caught and stuck in the catching gate, which can prevent or limit further vending of products.

In some embodiments, the product can slide by the force of gravity into the product retrieval platform when the product gates 1001 open. In some embodiments, the shelf system 1000 can be disposed at an angle matching the angle of the retrieval platform so that the products smoothly slide from the shelf system 1000 into the product retrieval platform. In some embodiments, the pusher plate 1002 can operate when the gates 1001 open to push the products down the product row 1006 towards the retrieval platform at a rate such that the frontmost product is deposited into the retrieval platform, and the gates 1001 close due to the retrieval platform releasing the button 1005 before a second product passes through the gates 1001. In some embodiments, the shelf system 1000 or the product can be disposed at a small angle, such as three degrees, while the force of the pusher plate 1002 can be increased by using a rotary damper that pushes the product into the retrieval platform, which helps alleviate tipping of products on the product tray 1006.

Figure 11:
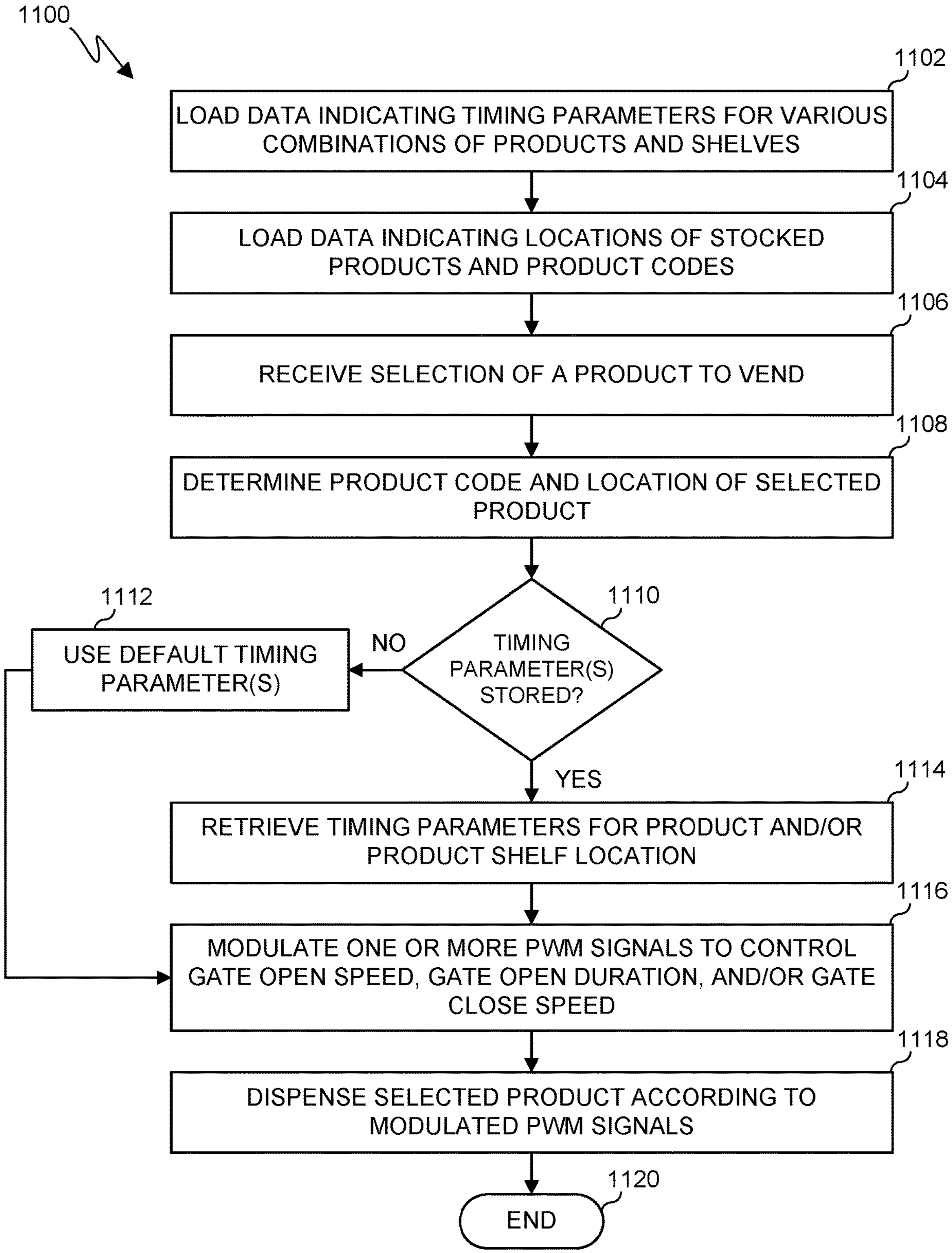
FIG. 11 illustrates a flowchart of a variable retrieval speed process according to embodiments of the present disclosure.

FIG. 11 illustrates a flowchart of a variable retrieval speed process 1100 according to embodiments of the present disclosure. FIG. 11 does not limit the scope of this disclosure to any particular embodiments. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. It will be understood that the process 1100 is described with respect to a processor of the vending machine 100, or the vending machine 200. However, the process 1100 can be used with any other suitable device(s) and in any suitable system.

At block 1102, the processor loads data indicating timing parameters for various combinations of products and shelves provided to the vending machine in memory. The timing parameters can include different timings for opening gates, duration that gates remain open, and closing gates. The timing parameters can be stored in association with certain products, certain vending machine shelf types, or both. For example, the timing parameters provided to the vending machine and stored in memory can be customized for a particular product or product type, such as defining how quickly to open a gate, how long to keep a gate open, and how quickly to close a gate, for the specific product. For instance, products can have different sizes and weights that can affect how quickly the products slide down a product row once a gate is opened. Heavier products that slide more quickly, for example, can have associated therewith timings for a smaller opening duration and a faster closing speed of the gate. In some cases, it may be that products slide quickly, but there is found to be a delay in which the product begins sliding. In such cases, the gate may be open for a longer duration to allow the products to begin sliding, but the gate closes quickly to prevent other fast sliding products from passing through the gate.

In a similar manner, gate timing can be controlled based on the type of product shelf or product rows, such as if a shelf or a product row includes certain dimensions, or if the shelf or product row is disposed at a particular angle within the vending machine. For example, if the shelf is disposed at a forty-five degree angle, products may slide down the product row faster than if the shelf is disposed at a three degree angle. Therefore, the timings for that shelf having that particular angle can be adjusted such that, for instance, the gate is open for a short duration and closes quickly to prevent subsequent products from also sliding through the gate. The timings can further be adjusted to account for both product type and shelf type. It will be understood that the above examples are merely for illustrating the types of gate timings that can be implemented, and do not limit this disclosure to any particular timings. A plurality of different timings can be used based on the products and the shelf or product row configuration.

At block 1104, the processor loads data indicating the locations of stocked products, and product codes associated with the stocked products. Thus, at block 1102, the timing parameters on various types of products and product locations can be stored ahead of time, but the timing parameters for these products and product locations are not necessarily specific to any currently stocked products. The timing parameters are stored such that they are available, and then, once the data indicating locations and product codes of stocked products is provided at block 1104, the timing parameters for those stocked products and their associated locations can be retrieved based on the previously stored timing parameters. In some embodiments, the timing parameters can be loaded at the same time as the data is loaded indicating the locations of stocked products and their product codes.

At block 1106, the processor receives a selection of a product to vend, such as column and row numbers, and/or letters, associated with locations in the vending machine. At block 1108, the processor determines a product code and location for the selected product based on the data loaded at block 1104 and based on the product selected at block 1106. In some embodiments, instead of receiving numeric or alpha-numeric indicators, the vending machine can include buttons or other user input components that each include an image or picture of a product, or otherwise identifies a product by name, flavor, or other identifier. Each of the buttons or other user input components is associated with a product stored in the memory of the vending machine in association with one or more product locations in the vending machine. Upon selection of a button or other user input component, at block 1108, the processor determines the product or product code associated with the button or other user input component, and determines a location for the selected product based on the selected product and based on the data loaded at block 1104. At decision block 1110, the processor determines whether timing parameters are stored for the selected product and/or the associated storage location of the product. If not, the process 1100 moves to block 1112, in which the processor retrieves default gate timing parameters to use. The process 1100 then moves to block 1116.

If, at decision block 1110, the processor determines that timing parameters are stored for the product and/or the product's location, the process 1100 moves to block 1114. At block 1114, the processor retrieves timing parameters for the product and/or the product location. At block 1116, the processor modulates one or more pulse width modulation ("PWM") signals to control the timing of a product gate associated with the product and the product's location. In some embodiments, other control methods can be used, such as variable voltage or current methods. For example, the processor can modulate the PWM signals to control any or all of a gate open speed, a gate open duration, and a gate close speed. As described herein, altering gate open and close speeds, and gate open duration, allows for products of various types to be dispensed effectively and can account for various configurations of vending machine shelves. At block 1118, the processor, via the PWM signals to the product dispensers or gates, dispenses the selected product according to the modulated PWM signals and the timing parameters. The processor ends at block 1120.

Controlling of the speed and timing of product dispensing as described herein allows for the use of one product gate, such as shown in FIGS. 6A-6D. In other vending machines, when vending a product, the machine opens a front gate to allow exactly one product to move through the gate and dispense, while using a second rear gate that closes when the front gate opens to prevent other products from dispensing. The distance between the front and rear gates becomes a critical factor. Packages that do not fit this distance well cannot be vended reliably, limiting package flexibility.

The single gate design and adjustable timing disclosed herein allows for a greater range of package types. The timing parameters depend on numerous characteristics including the material, shape, weight, and contents of each product as well as the dimensions and other characteristics of the shelf holding the product. The transition speed between closed to open position of the gate, how long it should remain open, and how quickly the gate should transition from open to closed can all be controlled. In some embodiments, additional sensors can be installed within the vending machine that provide feedback on the timing parameters, which can be used to further optimize the timing parameters.

Figure 12:
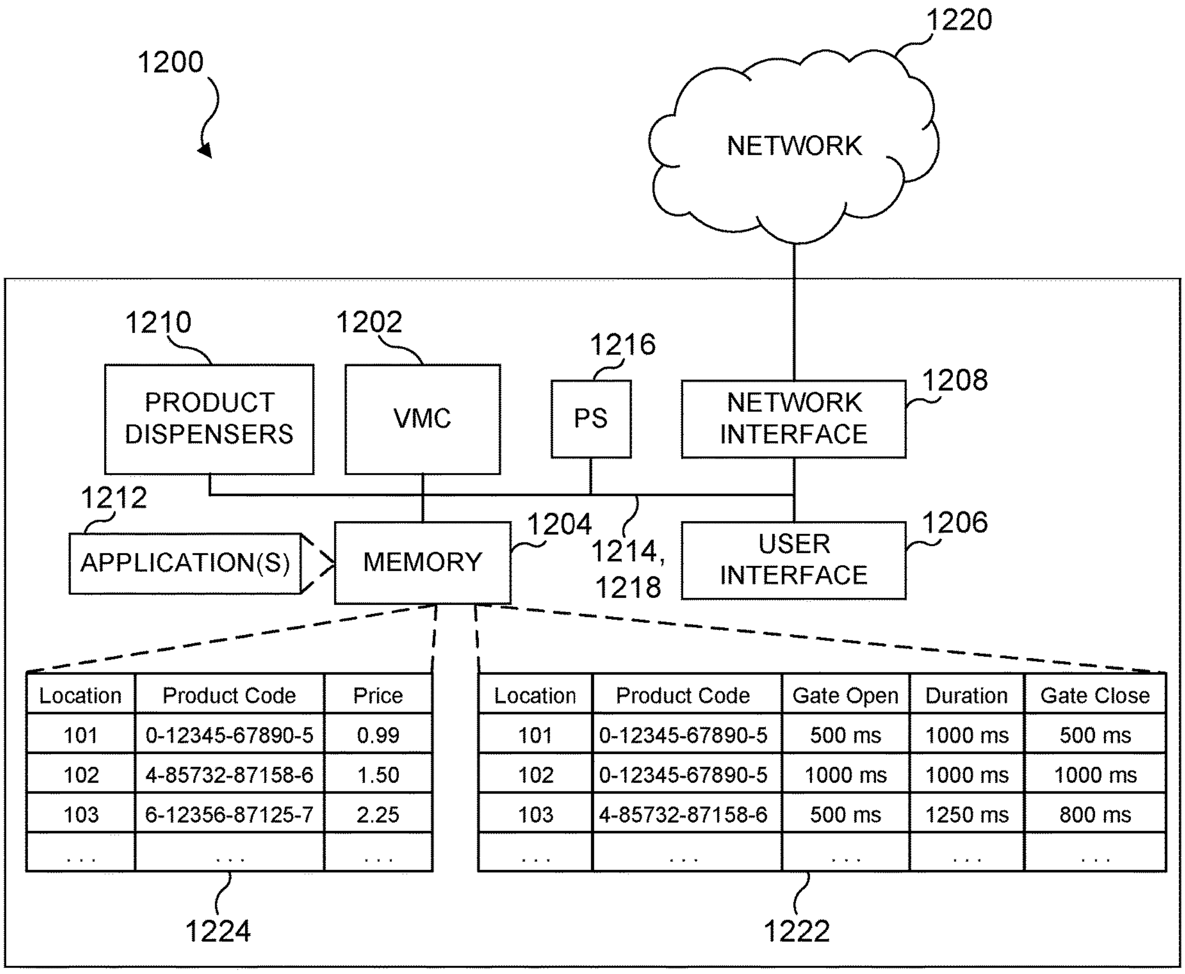
FIG. 12 illustrates an example vending machine variable timing system in accordance with various embodiments of this disclosure.

FIG. 12 illustrates an example vending machine variable timing system 1200 in accordance with various embodiments of this disclosure. The system 1200 can be one example of a portion or all of internal components of the vending machine 100 or 200 or other devices disclosed herein. The system 1200 includes at least one vending machine controller ("VMC") (e.g., a processor/central processing unit ("CPU")) 1202, at least one memory 1204, and a user interface 1206, and one or more product dispensers 1210, such as one of or a combination of the product retrieval platform, product release gates, or other dispensing components disclosed in the various embodiments herein. In some embodiments, the system 1200 can also include at least one network interface 1208, or network interface controllers (NICs). The network interface 1208 is configured to communicate with devices external to the vending machine system 1200 over a network 1220. In some embodiments, the system 1200 does not include a network interface. The components 1202, 1204, 1206, 1208, and 1210 can be interconnected by a data transport system (e.g., a bus) 1214. A power supply unit (PSU) 1216 provides power to components of the system 1200 via a power transport system 1218 (shown with data transport system 1214, although the power and data transport systems may be separate).

It will be understood that the system 1200 may be differently configured and that each of the listed components may actually represent several different components. For example, the VMC 1202 may actually represent a multiprocessor or a distributed processing system; the memory 1204 may include different levels of cache memory, and main memory; the user interface 1206 may include monitors, keyboards, touchscreens, keypads, and the like, that can be used for products selection; the at least one network interface 1208 may include one or more network cards providing one or more wired and/or wireless connections to the network 1220. Therefore, a wide range of flexibility is anticipated in the configuration of the system 1200, which may range from a single physical platform configured primarily for a single user or autonomous operation to a distributed multi-user platform such as a cloud computing system. The network 1220 may be a single network or may represent multiple networks, including networks of different types, whether wireless or wired. For example, the system 1200 may be coupled to external devices via a network that includes a cellular link coupled to a data packet network, or may be coupled via a data packet link such as a wide local area network (WLAN) coupled to a data packet network or a Public Switched Telephone Network (PSTN). Accordingly, many different network types and configurations may be used to couple the system 1200 with external devices.

The memory 1204, in various embodiments, can include instructions, utilized by the VMC 1202, for performing some or all of the steps, processes, and methods described herein. For example, the memory 1204 can store one or more applications 1212 that provide instructions for performing storing and retrieving timing parameters and currently stocked product data, and for adjusting the timing of the product dispensers 1210 based on the retrieved timing parameters and currently stocked product data. For example, the memory 1204 can store timing parameter data 1222, which, as illustrated in FIG. 12, can be based on criteria such as vending machine storage locations, represented, for example, by a location identifier, and product types, represented, for example, by product codes. In the various embodiments herein, the product code can be a universal product code ("UPC").

The timing parameter data 1222 can further include product dispenser timings specific to combinations of vending machine storage locations and product types. For example, as illustrated in FIG. 12, a product having product code "0-12345-67890-5" stored at a location having identifier "101" can have a gate open speed of 500 ms, a gate open duration of 1000 ms, and a gate close speed of 500 ms. Since different locations in the vending machine may have different product shelf configurations, such as product shelf angle, the same product can have different timings for different locations. For example, the product having the same product code of "0-12345-67890-5" can be associated with different timings if stored at a different location, such as shown in FIG. 12 when stored at another location with location identifier "102." When this same product type is stored at this other location, the timings are altered to have a gate open speed, a gate open duration, and a gate close speed of 1000 ms.

The timing parameter data 1222, in some embodiments, can be pre-loaded before data concerning stocked products and associated locations is loaded. As such, data on a specific product and location can be stored ahead of time in the event that such a product and location combination are used in the vending machine. As such, it will be understood that the timing parameter data 1222 can include any number of timings for products, vending machine storage locations, or combinations thereof, and the examples shown in FIG. 12 are not limiting. The memory 1204 also can store stocked product data 1224. The stocked product data 1224 includes products, such as identified by product codes, the locations in the vending machine where the products are currently stored, prices for the products, and other information. When a customer selects a product for vending via the user interface 1206, the VMC 1202 retrieves the price and product code for the location from the stocked product data 1224 in the memory 1204. The VMC 1202 can use the location and product code to also retrieve product dispenser timings from the timing parameter data 1222 in the memory 1204 for the product and location combination. The VMC 1202 can then, as disclosed in the various embodiments herein, adjust the timings of the product dispenser for the specific product, location, or combination thereof.

The various embodiments described herein can also be used in a micromarket environment. In a micromarket, customers can walk in, open a door and pick up a product. They can pay after taking products from a shelf. Some cashless stores employ multiple sensors to observe products on shelves and use data from those shelves to determine if a product is picked up. In some cases, products are behind a gate. If a product is behind a gate that permits variable times in closing, variable gate closing times as described in the various embodiments herein could reduce or eliminate using a sensor to monitor if a product is picked, especially if shelves are at an angle and when a customer is pulling out a product the gate opens to allow customer to pull the product and closes afterwards, ensuring that only one product is pulled at a time. In one aspect thereof, a vending machine comprises a chassis, at least one shelf including a plurality of product rows, a plurality of product gates each coupled to an associated one of the plurality of product rows, a movable stage, a retrieval platform coupled to the movable stage, wherein the retrieval platform is operable to move to accept a product from one of the plurality of product rows, and a vending machine controller coupled to at least one memory. The vending machine controller is configured to determine a product code and a storage location of a selected product for vending, retrieve, from the at least one memory, timing parameters associated with at least one of the product code or the storage location of the selected product, and control one or more timings of one of the plurality of product gates associated with the determined storage location of the selected product, based on the retrieved timing parameters, to release the selected product from the at least one shelf to the retrieval platform.

In some vending machine systems, when receiving a product from a column or a product tray into a non-tilting platform or dispenser having a horizontal base, the product may tilt or bridge. Bridging occurs when the top of a product tilts during the vending process and is unable to move from the tray into the dispenser. Tilting and bridging lead to failed product exchanges from the tray to the dispenser. Additionally, products on a product tray can slide into the product retrieval platform from the product tray when a product gate is opened. The product gate then closes to retain other products on the product tray. However, different product types can slide or move down the product tray at different rates depending on various aspects of the product such as the size or weight of the product. If the product gates were to all open and close at the same rates, this could lead to failed product exchanges in which a product is not released from the tray or is caught in the gate due to the gate closing too soon, for example. In some cases, it may be that products slide quickly, but there is found to be a delay in which the product begins sliding. In addition, different product trays, such as product trays of different angles, can cause products to slide at different rates.

To address the technical problems above, this disclosure provides a vending machine comprising a chassis, at least one shelf system including a plurality of product rows, a plurality of product gates each coupled to an associated one of the plurality of product rows, a movable stage, a retrieval platform coupled to the movable stage, wherein the retrieval platform is operable to move to accept a product from one of the plurality of product rows, and a vending machine controller coupled to at least one memory. The vending machine controller is configured to determine a product code and a storage location of a selected product for vending, retrieve, from the at least one memory, timing parameters associated with at least one of the product code or the storage location of the selected product, and control one or more timings of one of the plurality of product gates associated with the determined storage location of the selected product, based on the retrieved timing parameters, to release the selected product from the at least one shelf system to the retrieval platform.

To address the technical problems above, this disclosure also provides a method of dispensing a product from a vending machine comprising receiving data on a selected product for vending, determining a product code and a storage location of a selected product for vending, retrieving timing parameters associated with at least one of the product code or the storage location of the selected product, moving a retrieval platform coupled to a moveable stage to a position to accept the selected product from one of a plurality of product rows of at least one shelf system of the vending machine, and controlling one or more timings of one of a plurality of product gates associated with the determined storage location of the selected product, based on the retrieved timing parameters, to release the selected product from the at least one shelf system to the retrieval platform, wherein each of the plurality of product gates are coupled to an associated one of the plurality of product rows.

In one example embodiment, a vending machine comprises a chassis, at least one shelf system including a plurality of product rows, a plurality of product gates each coupled to an associated one of the plurality of product rows, a movable stage, a retrieval platform coupled to the movable stage, wherein the retrieval platform is operable to move to accept a product from one of the plurality of product rows, and a vending machine controller coupled to at least one memory. The vending machine controller is configured to determine a product code and a storage location of a selected product for vending, retrieve, from the at least one memory, timing parameters associated with at least one of the product code or the storage location of the selected product, and control one or more timings of one of the plurality of product gates associated with the determined storage location of the selected product, based on the retrieved timing parameters, to release the selected product from the at least one shelf system to the retrieval platform.

In one or more of the above examples, the timing parameters include parameters for a gate opening speed, a gate open duration, and a gate closing speed.

In one or more of the above examples, to control the one or more timings of the one of the plurality of product gates, the vending machine controller is further configured to modulate one or more pulse width modulation (PWM) signals, wherein each of the one or more PWM signals are associated with one of the gate opening speed, the gate open duration, and the gate closing speed.

In one or more of the above examples, the timing parameters associated with the storage location of the selected product are based on dimensions of the at least one shelf system and an angle of one of the plurality of product rows associated with the storage location of the selected product.

In one or more of the above examples, the timing parameters associated with the product code are based on at least one of shape or weight of a product type associated with the product code.

In one or more of the above examples, the vending machine further comprises a pusher plate mounted on a sidewall of at least one product row of the plurality of product rows, wherein the pusher plate is operable to push products in the at least one product row towards an end of the at least one product row.

In one or more of the above examples, the end of the at least one product row is associated with a retrieval location of the retrieval platform.

In one or more of the above examples, the retrieval platform includes a surface disposed at a base of the retrieval platform, and wherein the retrieval platform is operable to rotate in a direction of the at least one shelf system when the movable stage positions the retrieval platform in relation to one of the plurality of product rows.

In one or more of the above examples, each of the plurality of product gates includes a release mechanism operable to release a product from the associated one of the plurality of product rows when, due to the rotation of the retrieval platform, the surface of the retrieval platform depresses the release mechanism.

In one or more of the above examples, an angle of the retrieval platform, when the retrieval platform rotates in the direction of the at least one shelf system, matches an angle of at least one of the plurality of product rows.

In another example embodiment, a method of dispensing a product from a vending machine comprises receiving data on a selected product for vending, determining a product code and a storage location of a selected product for vending, retrieving timing parameters associated with at least one of the product code or the storage location of the selected product, moving a retrieval platform coupled to a moveable stage to a position to accept the selected product from one of a plurality of product rows of at least one shelf system of the vending machine, and controlling one or more timings of one of a plurality of product gates associated with the determined storage location of the selected product, based on the retrieved timing parameters, to release the selected product from the at least one shelf system to the retrieval platform, wherein each of the plurality of product gates are coupled to an associated one of the plurality of product rows.

In one or more of the above examples, the timing parameters include parameters for a gate opening speed, a gate open duration, and a gate closing speed.

In one or more of the above examples, controlling the one or more timings of the one of the plurality of product gates includes modulating one or more pulse width modulation (PWM) signals, wherein each of the one or more PWM signals are associated with one of the gate opening speed, the gate open duration, and the gate closing speed.

In one or more of the above examples, the timing parameters associated with the storage location of the selected product are based on dimensions of the at least one shelf system and an angle of one of the plurality of product rows associated with the storage location of the selected product.

In one or more of the above examples, the timing parameters associated with the product code are based on at least one of shape or weight of a product type associated with the product code.

In one or more of the above examples, the method further comprises pushing, with a pusher plate mounted on a sidewall of at least one product row of the plurality of product rows, products in the at least one product row towards an end of the at least one product row.

In one or more of the above examples, the end of the at least one product row is associated with a retrieval location of the retrieval platform.

In one or more of the above examples, the retrieval platform includes a surface disposed at a base of the retrieval platform, and further comprising rotating the retrieval platform in a direction of the at least one shelf system when the movable stage positions the retrieval platform in the position to accept the selected product.

In one or more of the above examples, the method further comprises depressing, by the surface of the retrieval platform when the retrieval platform rotates, a release mechanism of one of the plurality of product gates to release a product from the associated one of the plurality of product rows.

In one or more of the above examples, an angle of the retrieval platform, when the retrieval platform rotates in the direction of the at least one shelf system, matches an angle of at least one of the plurality of product rows.

While the present disclosure has described certain embodiments and generally associated methods, alterations and permutations of these embodiments and methods will be apparent to those skilled in the art. Accordingly, the above description of example embodiments does not define or constrain the present disclosure. Other changes, substitutions, and alterations are also possible without departing from the spirit and scope of the present disclosure, as defined by the following claims.

What is claimed is:

1. A vending machine, comprising:

a chassis;

at least one shelf system including a plurality of product rows;

a plurality of product gates each coupled to an associated one of the plurality of product rows;

a movable stage;

a retrieval platform coupled to the movable stage, wherein the retrieval platform is operable to move to accept a product from one of the plurality of product rows; and a vending machine controller coupled to at least one memory, wherein the vending machine controller is configured to:

determine a product code and a storage location of a selected product for vending, retrieve, from the at least one memory, gate timing parameters associated with at least one of the plurality of product gates, and associated with at least one of the product code or the storage location of the selected product wherein the gate timing parameters include parameters for a gate opening speed, a gate open duration, and a gate closing speed, and control one or more timings of one of the plurality of product gates associated with the determined storage location of the selected product, based on the retrieved gate timing parameters, to release the selected product from the at least one shelf system to the retrieval platform.

2. The vending machine of claim 1, wherein, to control the one or more timings of the one of the plurality of product gates, the vending machine controller is further configured to modulate one or more pulse width modulation (PWM) signals, wherein each of the one or more PWM signals are associated with one of the gate opening speed, the gate open duration, and the gate closing speed.

3. The vending machine of claim 1, wherein the gate timing parameters associated with the storage location of the selected product are based on dimensions of the at least one shelf system and an angle of one of the plurality of product rows associated with the storage location of the selected product.

4. The vending machine of claim 1, wherein the gate timing parameters associated with the product code are based on at least one of shape or weight of a product type associated with the product code.

5. The vending machine of claim 1, further comprising a pusher plate mounted on a sidewall of at least one product row of the plurality of product rows, wherein the pusher plate is operable to push products in the at least one product row towards an end of the at least one product row.

6. The vending machine of claim 5, wherein the end of the at least one product row is associated with a retrieval location of the retrieval platform.

7. The vending machine of claim 1, wherein the retrieval platform includes a surface disposed at a base of the retrieval platform, and wherein the retrieval platform is operable to rotate in a direction of the at least one shelf system when the movable stage positions the retrieval platform in relation to one of the plurality of product rows.

8. The vending machine of claim 7, wherein each of the plurality of product gates includes a release mechanism operable to release a product from the associated one of the plurality of product rows when, due to the rotation of the retrieval platform, the surface of the retrieval platform depresses the release mechanism.

9. The vending machine of claim 8, wherein an angle of the retrieval platform, when the retrieval platform rotates in the direction of the at least one shelf system, matches an angle of at least one of the plurality of product rows.

10. A method of dispensing a product from a vending machine, the method comprising:

receiving data on a selected product for vending;

determining a product code and a storage location of the selected product for vending;

retrieving gate timing parameters associated with at least one of a plurality of product gates, and associated with at least one of the product code or the storage location of the selected product wherein the gate timing parameters include parameters for a gate opening speed, a gate open duration, and a gate closing speed;

moving a retrieval platform coupled to a movable stage to a position to accept the selected product from one of a plurality of product rows of at least one shelf system of the vending machine; and controlling one or more timings of one of the plurality of product gates associated with the determined storage location of the selected product, based on the retrieved gate timing parameters, to release the selected product from the at least one shelf system to the retrieval platform, wherein each of the plurality of product gates are coupled to an associated one of the plurality of product rows.

11. The method of claim 10, wherein controlling the one or more timings of the one of the plurality of product gates includes modulating one or more pulse width modulation (PWM) signals, wherein each of the one or more PWM signals are associated with one of the gate opening speed, the gate open duration, and the gate closing speed.

12. The method of claim 10, wherein the gate timing parameters associated with the storage location of the selected product are based on dimensions of the at least one shelf system and an angle of one of the plurality of product rows associated with the storage location of the selected product.

13. The method of claim 10, wherein the gate timing parameters associated with the product code are based on at least one of shape or weight of a product type associated with the product code.

14. The method of claim 10, further comprising pushing, with a pusher plate mounted on a sidewall of at least one product row of the plurality of product rows, products in the at least one product row towards an end of the at least one product row.

15. The method of claim 14, wherein the end of the at least one product row is associated with a retrieval location of the retrieval platform.

16. The method of claim 10, wherein the retrieval platform includes a surface disposed at a base of the retrieval platform, and further comprising rotating the retrieval platform in a direction of the at least one shelf system when the movable stage positions the retrieval platform in the position to accept the selected product.

17. The method of claim 16, further comprising depressing, by the surface of the retrieval platform when the retrieval platform rotates, a release mechanism of one of the plurality of product gates to release a product from the associated one of the plurality of product rows.

18. The method of claim 17, wherein an angle of the retrieval platform, when the retrieval platform rotates in the direction of the at least one shelf system, matches an angle of at least one of the plurality of product rows.

* * * * *